US009762511B2

(12) United States Patent
Saito

(10) Patent No.: US 9,762,511 B2
(45) Date of Patent: Sep. 12, 2017

(54) COMMUNICATION DEVICE

(75) Inventor: Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/356,549

(22) Filed: Jan. 23, 2012

(65) Prior Publication Data

US 2012/0198090 A1   Aug. 2, 2012

(30) Foreign Application Priority Data

Jan. 31, 2011   (JP) ................. 2011-019131

(51) Int. Cl.
    *G06F 15/16*   (2006.01)
    *H04L 12/861*  (2013.01)

(52) U.S. Cl.
    CPC .................... *H04L 49/90* (2013.01)

(58) Field of Classification Search
    CPC ..... H04L 29/06; H04L 29/0653; H04L 49/90; H04L 29/08072; H04L 29/06095
    USPC .......................................... 709/236
    See application file for complete search history.

(56) References Cited

U.S. PATENT DOCUMENTS

| | | | | |
|---|---|---|---|---|
| 6,327,626 B1 * | 12/2001 | Schroeder | ............... | H04L 47/10 709/227 |
| 6,412,029 B1 * | 6/2002 | Mecklai | ............... | H04B 1/0003 710/22 |
| 6,438,128 B1 * | 8/2002 | Kashyap | ................. | H04L 29/06 370/389 |
| 6,842,263 B1 * | 1/2005 | Saeki | .................... | G06F 3/1203 358/1.15 |
| 6,954,797 B1 * | 10/2005 | Takeda | ................... | H04L 29/06 709/226 |
| 7,031,341 B2 * | 4/2006 | Yu | ......................... | H04J 3/1617 370/465 |

(Continued)

FOREIGN PATENT DOCUMENTS

| | | |
|---|---|---|
| EP | 2104282 A1 | 9/2009 |
| JP | H07-264201 A | 10/1995 |

(Continued)

OTHER PUBLICATIONS

European Patent Office, extended European Search Report for European Patent Application No. 12151280.0 (counterpart to above-captioned patent application), dated Jun. 28, 2012.

(Continued)

*Primary Examiner* — Farid Homayounmehr
*Assistant Examiner* — Sanchit Sarker
(74) *Attorney, Agent, or Firm* — Baker Botts L.L.P.

(57) ABSTRACT

A communication device may comprise a sending buffer having a first storage capacity, and a receiving buffer having a second storage capacity which is different from the first storage capacity. The communication device may determine a sending maximum data size in accordance with the first storage capacity, and determine a receiving maximum data size in accordance with the second storage capacity. The sending maximum data size and the receiving maximum data size may have different values. The communication device may perform a sending process for a sending frame of a sending target by utilizing the sending maximum data size, and perform a receiving process for a receiving frame of a receiving target by utilizing the receiving maximum data size.

22 Claims, 10 Drawing Sheets

(56) References Cited

U.S. PATENT DOCUMENTS

| | | | |
|---|---|---|---|
| 2001/0015956 A1 | 8/2001 | Ono | |
| 2003/0014570 A1* | 1/2003 | Takei | H04N 1/32358 710/22 |
| 2003/0079041 A1* | 4/2003 | Parrella, Sr. | G06F 17/30902 709/247 |
| 2003/0125056 A1 | 7/2003 | Jiang | |
| 2004/0044761 A1* | 3/2004 | Phillipi | H04L 12/2697 709/223 |
| 2004/0208177 A1 | 10/2004 | Ogawa | |
| 2005/0053095 A1* | 3/2005 | Kato | G06K 7/0008 370/474 |
| 2006/0171313 A1 | 8/2006 | Shimonishi | |
| 2006/0173986 A1* | 8/2006 | Ikeda | H04L 47/10 709/223 |
| 2007/0076618 A1 | 4/2007 | Hirose | |
| 2007/0147327 A1* | 6/2007 | Jin | H04W 76/04 370/342 |
| 2007/0233834 A1* | 10/2007 | Hattori | G06F 3/1204 709/223 |
| 2008/0037420 A1* | 2/2008 | Tang | H04L 1/1607 370/229 |
| 2008/0089347 A1* | 4/2008 | Phillipi | H04L 12/2697 370/400 |
| 2008/0101237 A1 | 5/2008 | Ogura et al. | |
| 2010/0058208 A1* | 3/2010 | Finn | G06Q 30/0625 715/764 |
| 2010/0332678 A1* | 12/2010 | Accapadi | H04L 65/4069 709/235 |
| 2012/0039184 A1* | 2/2012 | Akahane | H04L 41/0677 370/244 |
| 2012/0099145 A1* | 4/2012 | Miyasaka | G07G 5/00 358/1.15 |

FOREIGN PATENT DOCUMENTS

| | | |
|---|---|---|
| JP | 2001-237882 A | 8/2001 |
| JP | 2003-124984 A | 4/2003 |
| JP | 2003-258938 A | 9/2003 |
| JP | 2004-048393 A | 2/2004 |
| JP | 2006-195871 A | 7/2006 |
| JP | 2006-217234 A | 8/2006 |
| JP | 2007-082126 A | 3/2007 |
| JP | 2007-184710 A | 7/2007 |
| JP | 2008-118281 A | 5/2008 |

OTHER PUBLICATIONS

Japan Patent Office, Notification of Reason for Rejection for Japanese Patent Application No. 2011-019131 (counterpart to above-captioned patent application), mailed Jan. 7, 2014.

* cited by examiner

FIG. 5

(Common in All Embodiments)
- $S\_MTU \leq S\_MAX - V1$
- $R\_MTU \leq R\_MAX - V1$
- $S\_MSS \leq S\_MAX - V2$
- $R\_MSS \leq R\_MAX - V2$

FIG. 6

(First Embodiment)
- $S\_MTU = F\_SIZE - V1\,(S\_MAX \geq F\_SIZE)$
  or $S\_MAX - V1\,(F\_SIZE > S\_MAX)$
- $R\_MTU = F\_SIZE - V1\,(R\_MAX \geq F\_SIZE)$
  or $R\_MAX - V1\,(F\_SIZE > R\_MAX)$
- $S\_MSS = F\_SIZE - V2\,(S\_MAX \geq F\_SIZE)$
  or $S\_MAX - V2\,(F\_SIZE > S\_MAX)$
- $R\_MSS = F\_SIZE - V2\,(R\_MAX \geq F\_SIZE)$
  or $R\_MAX - V2\,(F\_SIZE > R\_MAX)$

FIG. 7

(First Specific Example of First Embodiment)
In Case of Printer (R_MAX > S_MAX)

| Condition | S_MTU | R_MTU |
|---|---|---|
| S_MAX ≥ F_SIZE | F_SIZE-V1 | F_SIZE-V1 |
| R_MAX ≥ F_SIZE > S_MAX | S_MAX-V1 | |

| Condition | S_MSS | R_MSS |
|---|---|---|
| S_MAX ≥ F_SIZE | F_SIZE-V2 | F_SIZE-V2 |
| R_MAX ≥ F_SIZE > S_MAX | S_MAX-V2 | |

FIG. 8

(Second Specific Example of First Embodiment)
In Case of Scanner (S_MAX > R_MAX)

| Condition | S_MTU | R_MTU |
|---|---|---|
| R_MAX ≥ F_SIZE | F_SIZE-V1 | F_SIZE-V1 |
| S_MAX ≥ F_SIZE > R_MAX | | R_MAX-V1 |

| Condition | S_MSS | R_MSS |
|---|---|---|
| R_MAX ≥ F_SIZE | F_SIZE-V2 | F_SIZE-V2 |
| S_MAX ≥ F_SIZE > R_MAX | | R_MAX-V2 |

FIG. 9

(Second Embodiment)
- S_MTU, S_MSS, R_MSS → Same as First Embodiment
- R_MTU=R_MAX−V1(Regardless of Value of F_SIZE)

FIG. 10

(First Specific Example of Second Embodiment)
In Case of Printer (R_MAX>S_MAX)

| Condition | S_MTU | R_MTU |
|---|---|---|
| S_MAX ≥ F_SIZE | F_SIZE−V1 | R_MAX−V1 |
| R_MAX ≥ F_SIZE>S_MAX | S_MAX−V1 | |

| Condition | S_MSS | R_MSS |
|---|---|---|
| S_MAX ≥ F_SIZE | F_SIZE−V2 | F_SIZE−V2 |
| R_MAX ≥ F_SIZE>S_MAX | S_MAX−V2 | |

FIG. 11

(Second Specific Example of Second Embodiment)
In Case of Scanner (S_MAX>R_MAX)

| Condition | S_MTU | R_MTU |
|---|---|---|
| R_MAX ≥ F_SIZE | F_SIZE−V1 | R_MAX−V1 |
| S_MAX ≥ F_SIZE>R_MAX | | |

| Condition | S_MSS | R_MSS |
|---|---|---|
| R_MAX ≥ F_SIZE | F_SIZE−V2 | F_SIZE−V2 |
| S_MAX ≥ F_SIZE>R_MAX | | R_MAX−V2 |

FIG. 12

(Third Embodiment)
- S_MTU, R_MTU → Same as First or Second Embodiment
- S_MSS = F_SIZE−V2(HP_S_SIZE ≥ F_SIZE)
  or HP_S_SIZE−V2(F_SIZE > HP_S_SIZE)
- R_MSS = F_SIZE−V2(HP_R_SIZE ≥ F_SIZE)
  or HP_R_SIZE−V2(F_SIZE > HP_R_SIZE)

FIG. 13

(First Specific Example of Third Embodiment)
In Case of Printer (R_MAX > HP_R_SIZE > S_MAX > HP_S_SIZE)

| Condition | S_MSS | R_MSS |
|---|---|---|
| HP_S_SIZE ≥ F_SIZE | F_SIZE−V2 | F_SIZE−V2 |
| S_MAX ≥ F_SIZE > HP_S_SIZE |  | F_SIZE−V2 |
| HP_R_SIZE ≥ F_SIZE > S_MAX | HP_S_SIZE−V2 | |
| R_MAX ≥ F_SIZE > HP_R_SIZE |  | HP_R_SIZE−V2 |

FIG. 14

(Second Specific Example of Third Embodiment)
In Case of Scanner (S_MAX > HP_S_SIZE > R_MAX > HP_R_SIZE)

| Condition | S_MSS | R_MSS |
|---|---|---|
| HP_R_SIZE ≥ F_SIZE | F_SIZE−V2 | F_SIZE_V2 |
| R_MAX ≥ F_SIZE > HP_R_SIZE | F_SIZE−V2 |  |
| HP_S_SIZE ≥ F_SIZE > R_MAX |  | HP_R_SIZE−V2 |
| S_MAX ≥ F_SIZE > HP_S_SIZE | HP_S_SIZE−V2 |  |

FIG. 15

(Third Specific Example of Third Embodiment)
In Case of Printer (R_MAX>HP_R_SIZE>S_MAX=HP_S_SIZE)

| Condition | S_MSS | R_MSS |
|---|---|---|
| S_MAX ≥ F_SIZE | F_SIZE-V2 | F_SIZE-V2 |
| HP_R_SIZE ≥ F_SIZE>S_MAX | S_MAX-V2 | |
| R_MAX ≥ F_SIZE>HP_R_SIZE | | HP_R_SIZE-V2 |

FIG. 16

(Fourth Specific Example of Third Embodiment)
In Case of Scanner (S_MAX=HP_S_SIZE>R_MAX>HP_R_SIZE)

| Condition | S_MSS | R_MSS |
|---|---|---|
| HP_R_SIZE ≥ F_SIZE | F_SIZE-V2 | F_SIZE-V2 |
| R_MAX ≥ F_SIZE>HP_R_SIZE | | HP_R_SIZE-V2 |
| S_MAX ≥ F_SIZE>R_MAX | | |

FIG. 17

(Fourth Embodiment)
- R_MTU, S_MSS, R_MSS → Same as Third Embodiment
- S_MTU = F_SIZE−V1(HP_S_SIZE ≥ F_SIZE)
  or HP_S_SIZE−V1(F_SIZE > HP_S_SIZE)

FIG. 18

(First Specific Example of Fourth Embodiment)
In Case of Printer (R_MAX > HP_R_SIZE > S_MAX > HP_S_SIZE)

| Condition | S_MTU | R_MTU |
|---|---|---|
| HP_S_SIZE ≥ F_SIZE | F_SIZE−V1 | F_SIZE−V1(*) |
| S_MAX ≥ F_SIZE > HP_S_SIZE | HP_S_SIZE−V1 | |
| HP_R_SIZE ≥ F_SIZE > S_MAX | | |
| R_MAX ≥ F_SIZE > HP_R_SIZE | | |

(*) This May be R_MAX−V1 (Second Embodiment)

FIG. 19

(Second Specific Example of Fourth Embodiment)
In Case of Scanner (S_MAX > HP_S_SIZE > R_MAX > HP_R_SIZE)

| Condition | S_MTU | R_MTU |
|---|---|---|
| HP_R_SIZE ≥ F_SIZE | F_SIZE−V1 | F_SIZE−V1(*) |
| R_MAX ≥ F_SIZE > HP_R_SIZE | | |
| HP_S_SIZE ≥ F_SIZE > R_MAX | | R_MAX−V1 |
| S_MAX ≥ F_SIZE > HP_S_SIZE | HP_S_SIZE−V1 | |

(*) This May be R_MAX−V1 (Second Embodiment)

COMMUNICATION DEVICE

CROSS-REFERENCE TO RELATED APPLICATIONS

This application claims priority to Japanese Patent Application No. 2011-019131, filed on Jan. 31, 2011, the contents of which are hereby incorporated by reference into the present application.

TECHNICAL FIELD

The technique taught in the present specification relates to a communication device to be connected with a network.

DESCRIPTION OF RELATED ART

A communication device usually comprises a sending buffer configured to store a sending frame to be sent to a network, and a receiving buffer configured to store a receiving frame received from the network. The sending buffer and the receiving buffer usually have the same storage capacity.

SUMMARY

However, in a case where the sending buffer and the receiving buffer have the same storage capacity, the sending buffer and the receiving buffer may not be utilized efficiently, and consequently a communication of data (i.e. sending and receiving of data) may not be performed efficiently. The present specification discloses a technique which may efficiently perform a communication of data.

The present specification discloses a communication device configured to be connected with a network. The communication device may comprise a sending buffer, a receiving buffer, one or more processors, and a memory that stores a computer program including instructions executed by the one or more processors. The sending buffer may be configured to store at least one sending frame to be sent to the network. The sending buffer may have a first storage capacity. The receiving buffer may be configured to store at least one receiving frame to be received from the network. The receiving buffer may have a second storage capacity which is different from the first storage capacity. The instructions may cause the one or more processors, when executed by the one or more processors, to function as a determination unit and a process performing unit. The determination unit may be configured to determine a sending maximum data size in accordance with the first storage capacity, and determine a receiving maximum data size in accordance with the second storage capacity. The sending maximum data size may be a maximum data size allowed as a data size of sending target data included in one sending frame. The receiving maximum data size may be a maximum data size allowed as a data size of receiving target data included in one receiving frame. The sending maximum data size and the receiving maximum data size may have different values. The process performing unit may be configured to perform a sending process for a sending frame of a sending target by utilizing the sending maximum data size, and perform a receiving process for a receiving frame of a receiving target by utilizing the receiving maximum data size.

Moreover, a control method and a computer program for realizing the communication device described above, and a non-transitory computer readable recording medium which stores the computer program, are also novel and useful.

BRIEF DESCRIPTION OF THE DRAWINGS

FIG. 5 shows MSS and MTU conditions common in all embodiments.
FIG. 6 shows MSS and MTU determination methods of a first embodiment.
FIG. 7 shows a first specific example of the first embodiment.
FIG. 8 shows a second specific example of the first embodiment.
FIG. 9 shows MSS and MTU determination methods of a second embodiment.
FIG. 10 shows a first specific example of the second embodiment.
FIG. 11 shows a second specific example of the second embodiment.
FIG. 12 shows MSS and MTU determination methods of a third embodiment.
FIG. 13 shows a first specific example of the third embodiment.
FIG. 14 shows a second specific example of the third embodiment.
FIG. 15 shows a third specific example of the third embodiment.
FIG. 16 shows a fourth specific example of the third embodiment.
FIG. 17 shows MSS and MTU determination methods of a fourth embodiment.
FIG. 18 shows a first specific example of the fourth embodiment.
FIG. 19 shows a second specific example of the fourth embodiment.

EMBODIMENT

First Embodiment

Configuration of System

Figure 1:
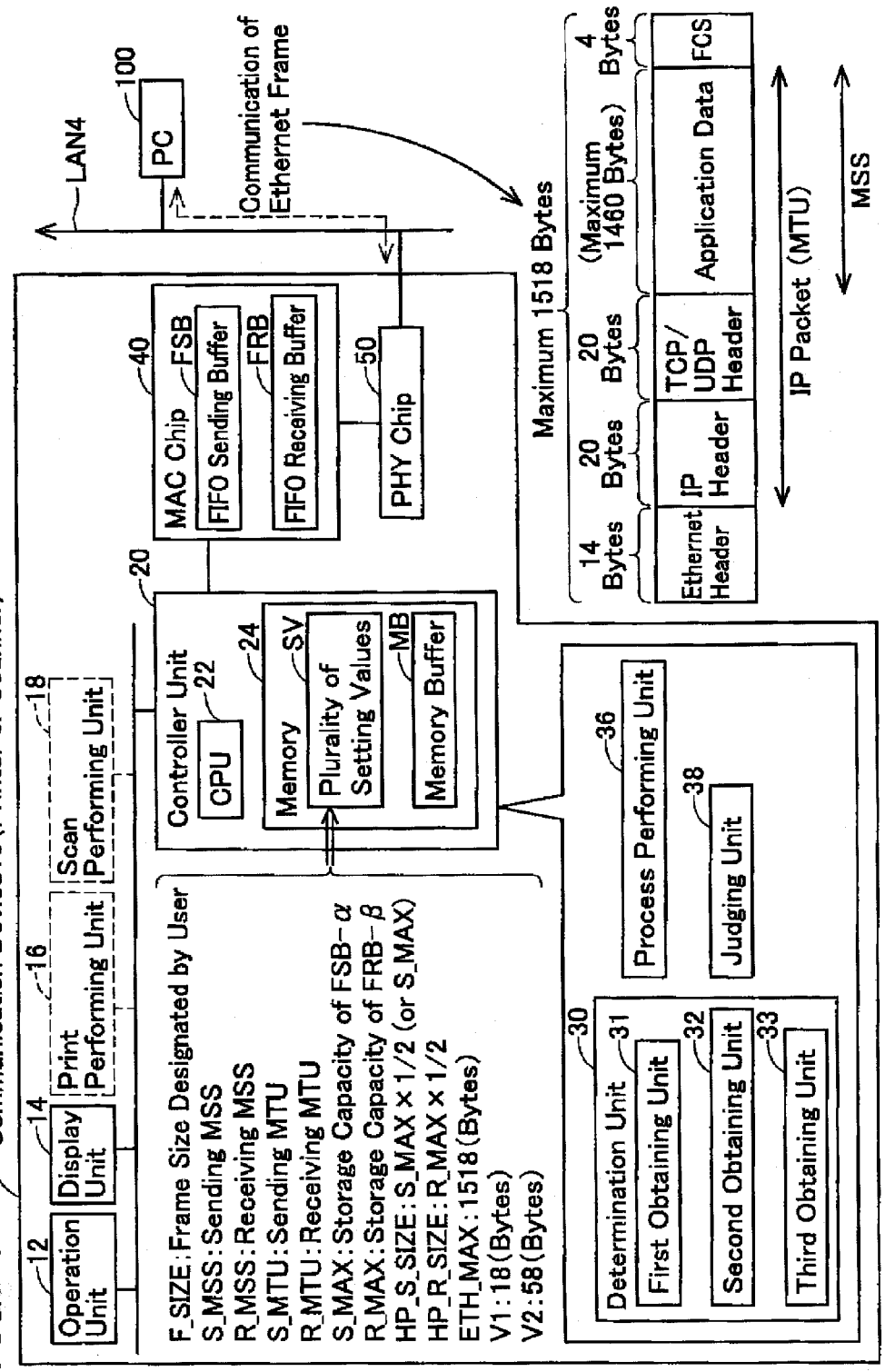
FIG. 1 shows an example of the configuration of a communication system.

As shown in FIG. 1, a communication system 2 comprises a communication device 10 (a peripheral device of a PC 100) and the PC 100. The communication device 10 and the PC 100 are connected with a LAN 4. The communication device 10 and the PC 100 are capable of mutual communication via the LAN 4.

The LAN 4 is a network that is compliant with Ethernet (registered trademark). In particular, the LAN 4 is a gigabit Ethernet network, i.e., capable of realizing a 1 gigabit/second communication speed. Moreover, the gigabit Ethernet may be any of 1000 BASE-SX, 1000 BASE-LX, 1000 BASE-CX (this is defined by IEEE802.3z) and 1000 BASE-T (this is defined by IEEE802.3ab).

(Configuration of Communication Device 10)

The communication device 10 comprises an operation unit 12, a display unit 14, a controller unit 20, a MAC chip 40 and a PHY chip 50. The units 12, 14, 20 are connected with a bus line (reference number omitted).

The communication device 10 further comprises at least one of a print performing unit 16 and a scan performing unit 18. In case the communication device 10 comprises the print performing unit 16, the communication device 10 is a printer. In case the communication device 10 comprises the scan performing unit 18, the communication device 10 is a scanner. In case the communication device 10 comprises both the print performing unit 16 and the scan performing unit 18, the communication device 10 is a multi-function device comprising at least a printing function and a scanning function.

The operation unit 12 comprises a plurality of keys. A user can input various instructions to the communication device 10 by operating the operation unit 12. The display unit 14 is a display for displaying various information.

The controller unit 20 comprises a CPU 22 and a memory 24. The CPU 22 performs various processes in accordance with a program (not shown) stored in the memory 24. The CPU 22 realizes the functions of a determination unit 30, a process performing unit 36 and a judging unit 38 by performing the processes in accordance with the program. Moreover, the determination unit 30 comprises a first obtaining unit 31, a second obtaining unit 32 and a third obtaining unit 33.

The memory 24 consists of a non-volatile memory, a volatile memory, etc. The memory 24 stores a plurality of setting values SV. The contents of the setting values will be described in detail later. The memory 24 comprises a memory buffer MB. The memory buffer MB stores an Ethernet frame (called "sending frame" below) to be sent to the LAN 4. In particular, the memory buffer MB stores the sending frame before it is moved from the memory 24 to a FIFO sending buffer FSB (to be described). The memory buffer MB further stores an Ethernet frame (called "receiving frame" below) to be received from the LAN 4. In particular, the memory buffer MB stores the receiving frame after it has been moved from a FIFO receiving buffer FRB (to be described) to the memory 24.

The MAC chip 40 performs the processes of a MAC layer, which is a sub-layer of an OSI (Open Systems Interconnection) reference model data link layer. The MAC chip 40 comprises the FIFO (First In First Out) sending buffer FSB and the FIFO receiving buffer FRB. The FIFO sending buffer FSB has a storage capacity for storing at least one sending frame. The FIFO receiving buffer FRB has a storage capacity for storing at least one receiving frame. Moreover, as will be described in detail later, the FIFO sending buffer FSB and the FIFO receiving buffer FRB have different storage capacities.

The PHY chip 50 performs processes of the physical layer of the OSI reference model. The PHY chip 50 is connected with the LAN 4, and is connected with the MAC chip 40. The sending frame being stored in the FIFO sending buffer FSB is sent to the LAN 4 via the PHY chip 50. Further, the receiving frame received from the LAN 4 is stored in the FIFO receiving buffer FRB via the PHY chip 50.

(Configuration of PC 100)

The PC 100 comprises an operation unit, a display unit, a controller unit, etc. (not shown). For example, in case the communication device 10 is a printer, the PC 100 stores a printer driver for the communication device 10. In this case, the PC 100 can send print data to the communication device 10. Further, in case the communication device 10 is a scanner, the PC 100 stores a scanner driver for the communication device 10. In this case, the PC 100 instructs the communication device 10 to perform a scan, and can receive scan data from the communication device 10.

Moreover, various types of data other than the print data and the scan data is communicated between the communication device 10 and the PC 100. The communication device 10 can communicate with the PC 100 using a TCP (Transmission Control Protocol), and can communicate with the PC 100 using a UDP (User Datagram Protocol). For example, the TCP is used in the aforementioned communication of print data or scan data. Further, for example, the UDP is used in SNMP (Simple Network Management Protocol) requests and responses.

(Configuration of Frame)

As described above, various data is communicated between the communication device 10 and the PC 100. The communication of data is performed with the frame as the minimum unit. In FIG. 1, the configuration of one frame is shown schematically. The TCP frame includes an Ethernet header, an IP header, a TCP header, application data and an FCS (Frame Check Sequence). Moreover, the UDP frame has approximately the same configuration as the TCP frame, but differs in the point of including the UDP header instead of the TCP header.

The Ethernet header, the IP header, the TCP header and the FCS respectively have a data size of 14 bytes, 20 bytes, 20 bytes and 4 bytes. These data sizes are predetermined as the Ethernet standard. By contrast, the data size of the application data is determined by the communication device that performs the Ethernet frame communication.

(MSS (Maximum Segment Size))

The maximum data size allowed as the data size of the application data included in one frame is called an "MSS". The MSS is a setting value determined by the communication device. In a normal Ethernet standard (not the gigabit Ethernet) such as 100 BASE or 10 BASE, 1518 bytes are predetermined as the maximum data size of one frame. Consequently, a communication device corresponding only to the normal Ethernet, and not corresponding to the gigabit Ethernet, usually uses 1460 (=1518−14−20−20−4) bytes as the MSS.

By contrast, the communication device 10 that corresponds to the gigabit Ethernet can use a value exceeding 1460 bytes as the MSS. Thus, when a value exceeding 1460 bytes is used as the MSS, a value greater than 1460 bytes is also used as the data size of the application data within the frame of the communication target. Thus, a frame that includes application data having a data size greater than 1460 bytes is called a "jumbo frame". Moreover, the user of the communication device 10 can select whether he wants to use the jumbo frame.

(S_MSS (Sending MSS) and R_MSS (Receiving MSS))

Moreover, as will be described in detail later, in the present embodiment, the maximum data size of the application data included in the sending frame is determined in accordance with the storage capacity of the FIFO sending buffer FSB, and the maximum data size of the application data included in the receiving frame is determined in accordance with the storage capacity of the FIFO receiving buffer FRB. That is, in the present embodiment, the sending MSS and the receiving MSS are determined. Below, the sending MSS and the receiving MSS are described respectively as the "S_MSS" and the "R_MSS".

(MTU (Maximum Transmission Unit))

A value equivalent to a value obtained by adding the data size of the IP header (20 bytes) and the data size of the TCP header (20 bytes) to the MSS is called an "MTU". Moreover, a combination of the IP header, the TCP header (or the UDP header) and the application data is usually called an "IP packet". Consequently, the MTU is the maximum data size allowed as the data size of the IP packet. As in the case of the MSS, the MTU is a setting value determined by the communication device. A communication device corresponding to only the normal Ethernet usually determines 1500 (1460+20+20) bytes as the MTU. The communication device 10 that corresponds to the gigabit Ethernet can determine a value exceeding 1500 bytes as the MTU.

(S_MTU (Sending MTU) and R_MTU (Receiving MTU))

As with the case of the MSS, in the present embodiment, the sending MTU and the receiving MTU are determined. Below, the sending MTU and the receiving MTU are described respectively as the "S_MTU" and the "R_MTU".

(Other Setting Values SV)

Here, the setting values SV used by the communication device 10 (i.e., the setting values SV stored in the memory 24 of the communication device 10) will be described. Moreover, the four setting values S_MSS, R_MSS, S_MTU and R_MTU have already been described.

(F_SIZE (Frame Size))

Figure 4:
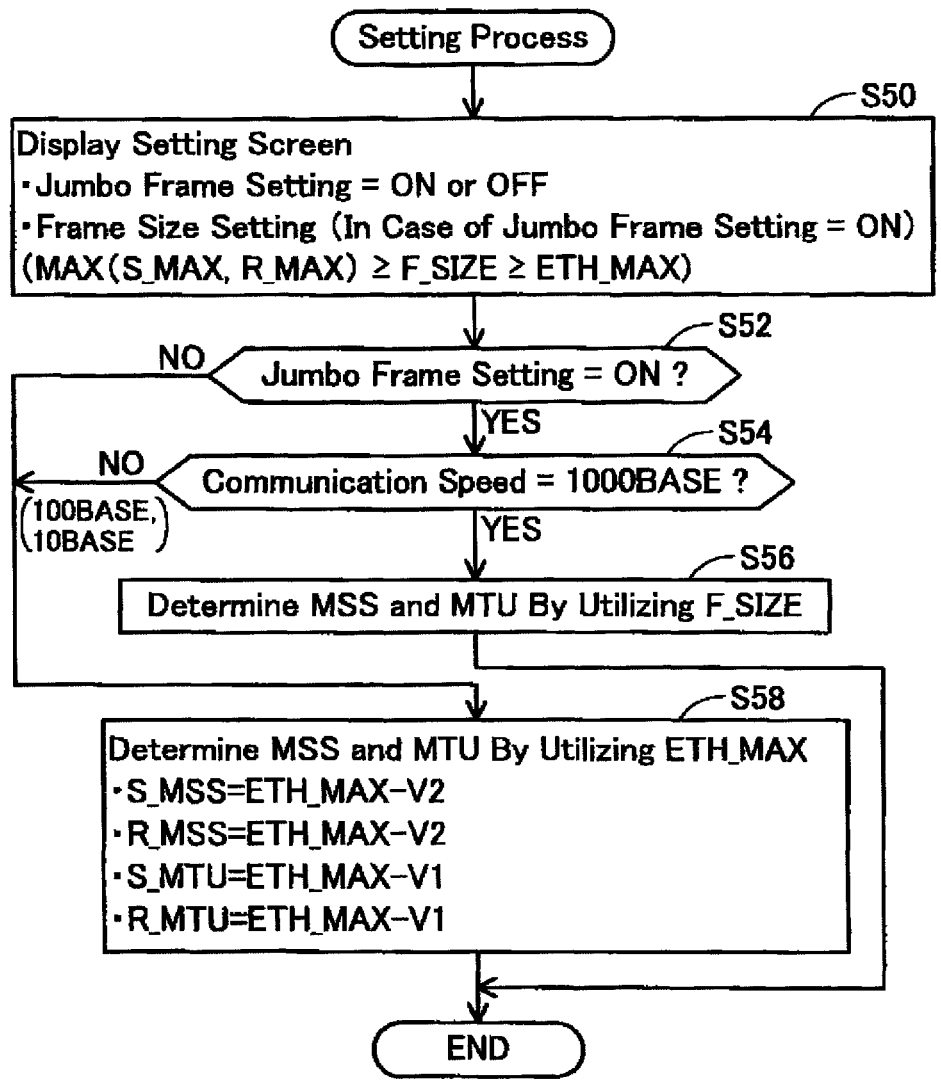
FIG. 4 shows a flowchart of a setting process.

The user can select whether he wants to use the jumbo frame (see S50 of FIG. 4). In case of wanting to use the jumbo frame, further, the user can designate the maximum data size of one frame (see S50 of FIG. 4). The F_SIZE is the maximum data size of one frame that was designated by the user in S50 of FIG. 4 (to be described).

(S_MAX (Sending MAX))

The S_MAX is the maximum data size of one sending frame that the FIFO sending buffer FSB is capable of storing. The S_MAX is determined in accordance with the storage capacity of the FIFO sending buffer FSB. Specifically, the S_MAX is a value equivalent to a value obtained by subtracting a predetermined value $\alpha$ from the storage capacity of the FIFO sending buffer FSB. The predetermined value $\alpha$ is a value determined in advance by a vendor of the communication device 10, and may be any value that is much smaller than the storage capacity of the FIFO sending buffer FSB. For example, in case of wanting to utilize the entire storage capacity of the FIFO sending buffer FSB, the vendor may adopt zero as the predetermined value $\alpha$, or may create slack by adopting a value greater than zero as the predetermined value $\alpha$.

(R_MAX (Receiving MAX))

The R_MAX is the maximum data size of one receiving frame that the FIFO receiving buffer FRB is capable of storing. The R_MAX is determined in accordance with the storage capacity of the FIFO receiving buffer FRB. Specifically, the R_MAX is a value equivalent to a value obtained by subtracting a predetermined value $\beta$ from the storage capacity of the FIFO receiving buffer FRB. In the present embodiment, $\alpha$ and $\beta$ are identical. Moreover, as described above, the FIFO sending buffer FSB and the FIFO receiving buffer FRB have different storage capacities. Consequently, the S_MAX and the R_MAX have different values.

(ETH_MAX (Ethernet MAX), V1, V2)

The ETH_MAX is the maximum data size (i.e. 1518 bytes) of one frame used by the normal Ethernet. Further, V1 is a value (i.e. 18 bytes) equivalent to the sum of the data size of the Ethernet header (14 bytes) and the data size of the FCS (4 bytes). V2 is a value (i.e. 58 bytes) equivalent to the sum of the data size of the Ethernet header (14 bytes), the data size of the IP header (20 bytes), the data size of the TCP header (20 bytes) and the data size of the FCS (4 bytes).

HP_S_SIZE and HP_R_SIZE shown in FIG. 1 will be described in detail in a third embodiment (to be described). Moreover, the S_MAX, R_MAX, ETH_MAX, V1, V2 are stored in advance in the memory 24 at the shipping stage of the communication device 10. The F_SIZE is stored in the memory 24 in S50 of FIG. 4 (to be described). Further, the four setting values S_MSS, R_MSS, S_MTU and R_MTU are stored in the memory 24 in S56 or S58 of FIG. 4 (to be described).

(Storage Capacity of Two Buffers FSB, FRB)

As described above, the communication device 10 of the present embodiment corresponds to the gigabit Ethernet that is capable of realizing a high communication speed. In order to further increase the efficiency of communication using the gigabit Ethernet, the communication device 10 uses the jumbo frame. Thus, in case the jumbo frame is used, the size of the data included in one frame increases, and consequently the storage capacity of the FIFO buffer must be increased.

In a conventional communication device, the FIFO sending buffer and the FIFO receiving buffer usually have the same storage capacity. Consequently, in case the communication device is made to correspond to a jumbo frame, the storage capacity of both the FIFO sending buffer and the FIFO receiving buffer is usually set to the same size. However, increasing the storage capacity of both buffers is comparatively expensive. In view of these circumstances, in the present embodiment, the communication device 10 is designed in advance such that the storage capacity of one of the two buffers FSB, FRB is larger than the storage capacity of the other.

For example, a printer mainly performs more data reception (i.e. reception of print data) than data sending and therefore, in case the communication device 10 is a printer, the communication device 10 is designed in advance such that the storage capacity of the FIFO receiving buffer FRB is larger than the storage capacity of the FIFO sending buffer FSB. Thus, the efficiency of the receiving process, which the printer performs with comparatively high frequency, can be improved. Further, since the printer performs the sending process with comparatively low frequency, it is not a problem if the storage capacity of the FIFO sending buffer FSB is comparatively small. Consequently, the two buffers FSB, FRB can each be used efficiently. Moreover, in case the communication device 10 is a printer, the R_MAX, which is determined in accordance with the storage capacity of the FIFO receiving buffer FRB, is larger than the S_MAX, which is determined in accordance with the storage capacity of the FIFO sending buffer FSB.

Further, for example, a scanner mainly performs more data sending (i.e. sending of scan data) than data reception and therefore, in case the communication device 10 is a scanner, the communication device 10 is designed in advance such that the storage capacity of the FIFO sending buffer FSB is larger than the storage capacity of the FIFO receiving buffer FRB. Thus, the efficiency of the sending process, which the scanner performs with comparatively high frequency, can be improved. Further, since the scanner performs the receiving process with comparatively low frequency, it is not a problem if the storage capacity of the FIFO receiving buffer FRB is comparatively small. Consequently, the two buffers FSB, FRB can each be used efficiently. Moreover, in case the communication device 10 is a scanner, the S_MAX, which is determined in accordance with the storage capacity of the FIFO sending buffer FSB, is larger than the R_MAX, which is determined in accordance with the storage capacity of the FIFO receiving buffer FRB.

Thus, according to the present embodiment, in order to increase the communication efficiency of the communication device 10, the vendor of the communication device 10 can adopt a method that, without increasing the storage capacity of both the buffers FSB, FRB, increases the storage capacity of only one of the two buffers FSB, FRB in accordance with the main function of the communication device 10. Consequently, the communication device 10 that corresponds to the jumbo frame can be realized at a lower cost than a conventional communication device in which both buffers have the same storage capacity.

Moreover, for example, in case the communication device 10 is a multi-function device capable of performing both a print function and a scan function, the vendor of the communication device 10 may design the communication device 10 so that the storage capacity of the buffer corresponding to the one function, from among the print function and the scan function, which is considered the main function (e.g. the FIFO receiving buffer in case printing is the main function) is larger than the storage capacity of the buffer corresponding to the other function.

Moreover, if the storage capacity of the two buffers of, for example, a printer were the same, the receiving process would be performed with comparatively high frequency, and consequently the storage capacity of the FIFO receiving buffer would be utilized sufficiently. However, the sending process would be performed with comparatively low frequency, and consequently the storage capacity of the FIFO sending buffer would not be utilized sufficiently. That is, the FIFO sending buffer would have excess storage capacity. Similarly, if the storage capacity of the two buffers of a scanner were the same, the FIFO receiving buffer would have excess storage capacity. By contrast, in the present embodiment, the storage capacity of the two buffers FSB, FRB is determined properly, and consequently the problem can be suppressed in which one buffer is not utilized sufficiently, i.e., in which one buffer has excess storage capacity. That is, the communication device 10 efficiently utilizes both the buffers FSB, FRB, allowing data communication to be performed efficiently.

(Communication Process Performed by Communication Device 10)

As described above, the communication device 10 can perform communication using the TCP and using the UDP. First, the contents of communication using the non-TCP will be described with reference to FIG. 2, then the contents of communication using the TCP will be described with reference to FIG. 3. Moreover, as described above, the communication device 10 uses two types of MSS for sending and receiving (S_MSS, R_MSS), and uses two types of MTU for sending and receiving (S_MTU, R_MTU). By contrast, in the PC 100, the storage capacity of the sending buffer and the storage capacity of the receiving buffer are the same, and consequently the PC 100 uses only one type of MSS (i.e. uses the MSS in common for sending and receiving), and uses only one type of MTU (i.e. uses the MTU in common for sending and receiving).

(Receiving of Non-TCP Frame (FIG. 2))

As will be described in detail later, in the TCP, so-called negotiation is performed between a pair of devices before the pair of devices communicate the target data of a communication target, and thus a communication session between the pair of devices is established. By contrast, in the UDP, negotiation between the pair of devices is not performed.

Figure 2:
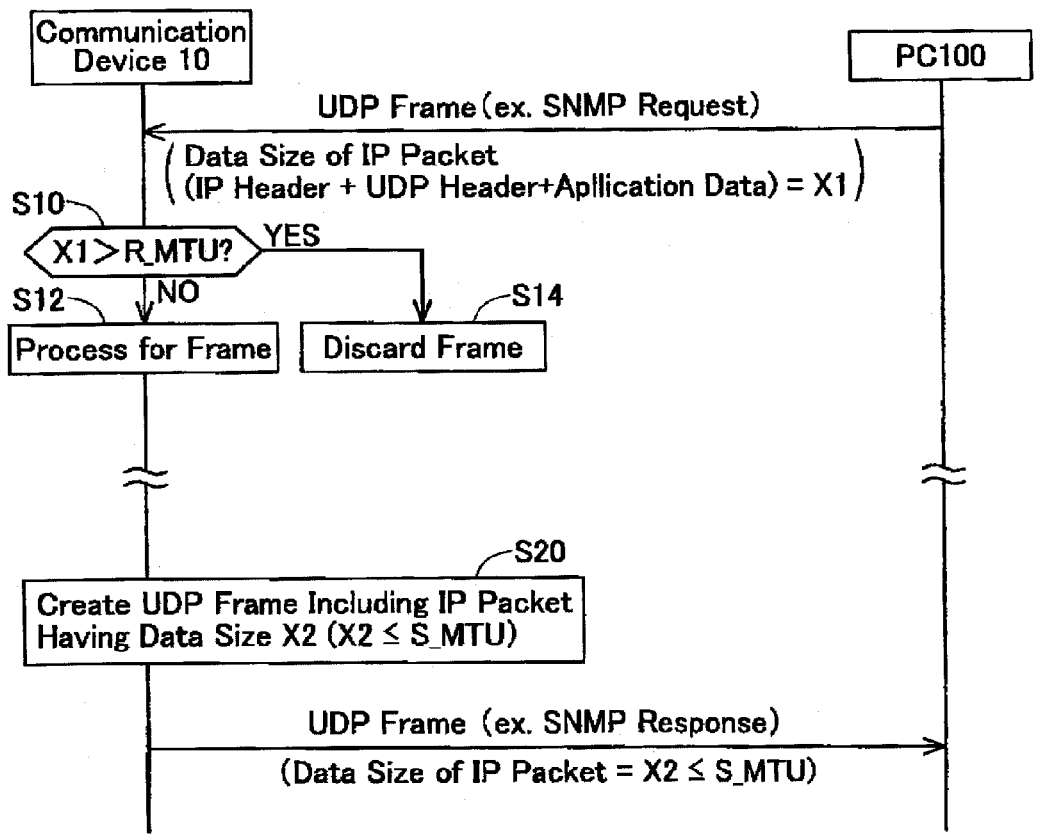
FIG. 2 shows communication in case of a non-TCP frame.

As shown in FIG. 2, in a state where a communication session has not been established between the communication device 10 and the PC 100, the PC 100 sends, to the communication device 10, a UDP frame (e.g. an SNMP request) that includes an IP packet (i.e. a combination of the IP header, the UDP header and the application data) having a data size X1 that is equal to or less than the MTU of the PC 100.

The UDP frame is received by the PHY chip 50 of the communication device 10, and is stored via the PHY chip 50 in the FIFO receiving buffer FRB. In this case, the process performing unit 36 (see FIG. 1) of the communication device 10 performs a receiving process (the processes S10 to S14) for the UDP receiving frame being stored in the FIFO receiving buffer FRB. In S10, the process performing unit 36 judges whether the data size X1 of the IP packet included in the UDP receiving frame is greater than the R_MTU being stored in the memory 24.

In case the data size X1 is equal to or less than the R_MTU (in case of NO in S10), in S12 the process performing unit 36 performs a process for moving the UDP receiving frame from the FIFO receiving buffer FRB to the memory buffer MB, and performs a process according to the data included in the UDP receiving frame (e.g. creation of an SNMP response, etc.).

On the other hand, in case the data size X1 is greater than the R_MTU (in case of YES in S10), in S14 the process performing unit 36 discards (i.e. deletes) the UDP receiving frame being stored in the FIFO receiving buffer FRB without moving it to the memory buffer MB.

(Sending of Non-TCP Frame)

Further, when a UDP frame is to be sent to the PC 100 (e.g. when a response corresponding to the SNMP request is to be sent), the process performing unit 36 performs a sending process for the UDP sending frame (the process S20 and a process of moving the sending frame). In S20, the process performing unit 36 creates the UDP sending frame within the memory buffer MB. At this juncture, the process performing unit 36 creates the UDP sending frame that includes an IP packet having a data size X2 equal to or less than the S_MTU being stored in the memory 24. That is, the process performing unit 36 prevents the creation of a UDP sending frame that includes an IP packet having a data size greater than the S_MTU.

Next, the process performing unit 36 moves the UDP sending frame created in S20 to the FIFO sending buffer FSB. Thus, the UDP sending frame being stored in the FIFO sending buffer FSB is sent via the PHY chip 50 to the PC 100.

As with the process S10 of the communication device 10, the PC 100 judges whether the data size of the IP packet included in the UDP frame sent from the communication device 10 is greater than the MTU of the PC 100. Then, as with the processes S12 and S14 of the communication device 10, the PC 100 performs the UDP frame process or discards the frame, in accordance with the judgment results.

(Receiving of TCP Frame (FIG. 3))

Figure 3:
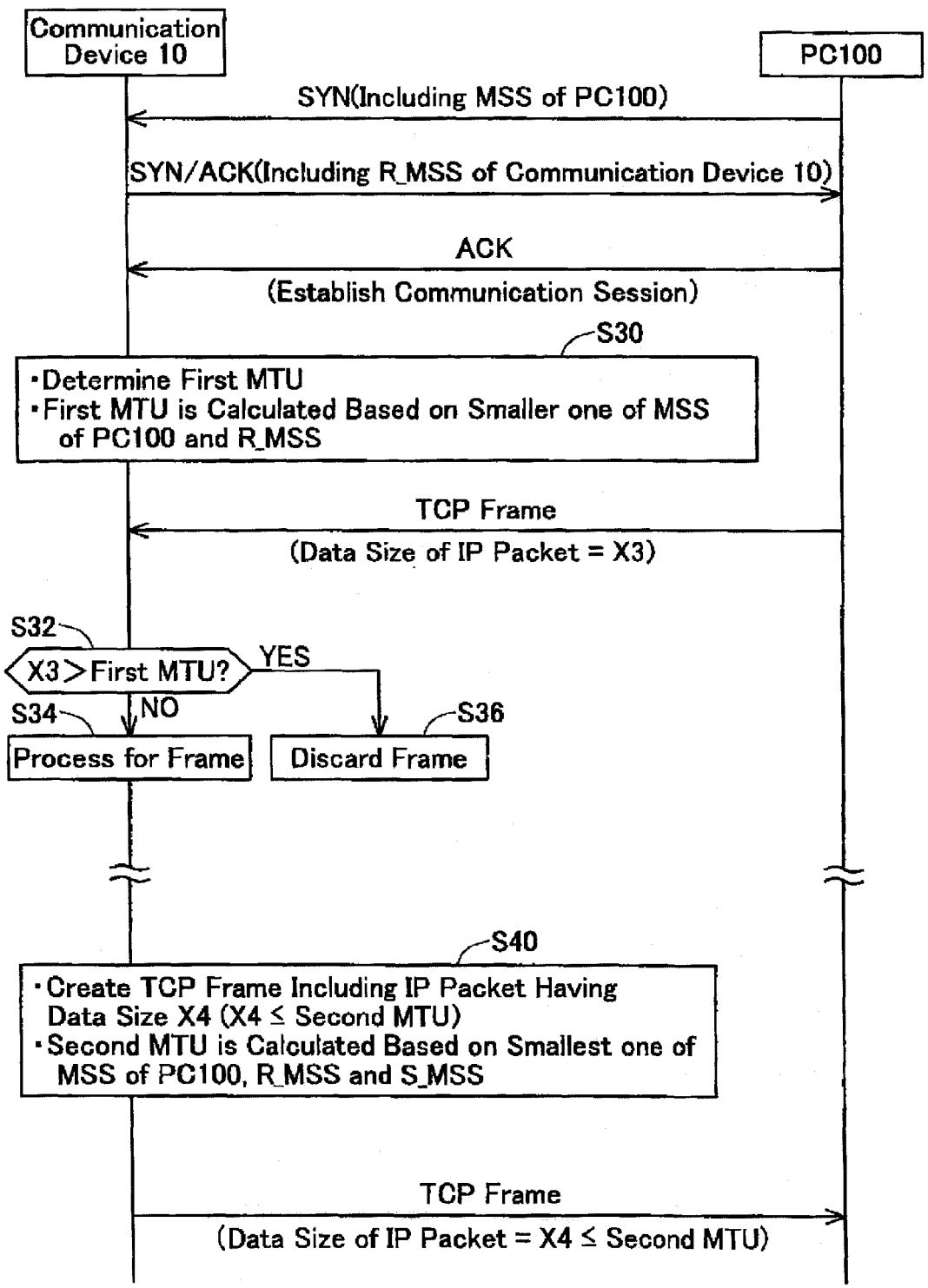
FIG. 3 shows communication in case of a TCP frame.

As shown in FIG. 3, when the TCP frame is to be sent to the communication device 10, the PC 100 first sends a SYN signal to the communication device 10. The SYN signal includes the MSS of the PC 100 that has been set in the PC 100. In this case, the process performing unit 36 of the communication device 10 sends a SYN/ACK signal to the PC 100. The SYN/ACK signal includes the R_MSS being stored in the memory 24 (i.e. the R_MSS of the communication device 10 that has been set in the communication device 10). Then, the PC 100 sends an ACK signal to the communication device 10. Thus, the negotiation between the communication device 10 and the PC 100 ends, and a communication session between the communication device 10 and the PC 100 is established.

Next, the process performing unit 36 performs a receiving process (the processes S30 to S36 of FIG. 3) for the TCP receiving frame received from the PC 100. In S30, the process performing unit 36 determines a first MTU utilizing the MSS of the PC 100 and the R_MSS of the communication device 10. Specifically, the process performing unit 36 first selects the smaller value from among the MSS of the PC 100 and the R_MSS of the communication device 10. Then, the process performing unit 36 determines the first MTU by adding 40 bytes (the data size of the IP header+the data size of the TCP header) to the selected value.

In a state where a communication session between the communication device 10 and the PC 100 has been established, the PC 100 sends a TCP frame (e.g. print data) to the communication device 10. An IP packet (i.e. a combination of the IP header, the UDP header and the application data) included in the TCP frame has a data size X3. Moreover, the PC 100 also selects the smaller value from among the MSS of the PC 100 and the R_MSS of the communication device 10, and determines a specific MTU (i.e. an MTU having the same value as the first. MTU) by adding 40 bytes to the selected value. Then, the PC 100 usually sends, to the communication device 10, the TCP frame that includes an IP packet having the data size X3 that is equal to or less than the determined specific MTU (i.e. the first MTU).

The TCP frame is received by the PHY chip 50 of the communication device 10, and is stored via the PHY chip 50 in the FIFO receiving buffer FRB. In this case, in S32, the process performing unit 36 judges whether the data size X3 of the IP packet included in the TCP receiving frame that is being stored in the FIFO receiving buffer FRB is greater than the first MTU determined in S30.

As described above, the PC 100 usually sends, to the communication device 10, the TCP frame that includes an IP packet having the data size X3 equal to or less than the first MTU. Consequently, in S32, the data size X3 is usually judged to be equal to or less than the first MTU (S32: NO). In this case, in S34, the process performing unit 36 performs a process for moving the TCP receiving frame from the FIFO receiving buffer FRB to the memory buffer MB, and a process according to the data included in the TCP receiving frame (e.g. printing, etc.).

Moreover, if both the communication device 10 and the PC 100 were to adopt a configuration that uses an MTU determined based on the larger value from among the MSS of the PC 100 and the R_MSS of the communication device 10, then, for example, the PC 100 could send a TCP frame having a data size exceeding the R_MAX to the communication device 10. In this case, the communication device 10 would be unable to store the TCP frame sent from the PC 100 in the FIFO receiving buffer (i.e. could not receive the TCP frame). By contrast, when both the communication device 10 and the PC 100 adopt a configuration, as in the present embodiment, that uses an MTU determined based on the smaller value from among the MSS of the PC 100 and the R_MSS of the communication device 10, the communication device 10 can reliably receive the TCP frame sent from the PC 100.

Moreover, in case, for example, the data size X3 is greater than the first MTU (in case of YES in S32), in S36 the process performing unit 36 discards (i.e. deletes) the TCP receiving frame being stored in the FIFO receiving buffer FRB without moving it to the memory buffer MB.

(Sending of TCP Frame)

Further, in a state where a communication session between the communication device 10 and the PC 100 has been established, when a TCP frame is to be sent to the PC 100 (for example, when reception confirmation of print data is to be sent, when scan data is to be sent, etc.), the process performing unit 36 performs a sending process for a TCP sending frame (the process S40 and a process of moving the sending frame).

In S40, the process performing unit 36 creates the TCP sending frame within the memory buffer MB. At this juncture, the process performing unit 36 first selects the smallest value from among the MSS of the PC 100, the R_MSS of the communication device 10 and the S_MSS of the communication device 10. Then, the process performing unit 36 determines a second MTU by adding 40 bytes (the data size of the IP header+the data size of the TCP header) to the selected value. Then, the process performing unit 36 creates a TCP sending frame that includes an IP packet having a data size X4 equal to or less than the second MTU. That is, the process performing unit 36 prevents the creation of a TCP sending frame that includes an IP packet having a data size greater than the second MTU.

Next, the process performing unit 36 moves the TCP sending frame created in S40 to the FIFO sending buffer FSB. Thus, the TCP sending frame being stored in the FIFO sending buffer FSB is sent via the PHY chip 50 to the PC 100.

Moreover, as described above, the PC 100 determines the specific MTU based on the smaller value from among the MSS of the PC 100 and the R_MSS of the communication device 10. As with the case of the process S32 of the communication device 10, the PC 100 judges whether the data size of the IP packet included in the TCP frame sent from the communication device 10 is greater than the specific MTU. Then, as with the case of the processes S34 and S36 of the communication device 10, the PC 100 performs the process for the TCP frame or discards the frame, in accordance with the judgment results.

Moreover, in S40, the second MTU is determined based on the smallest value from among the MSS of the PC 100, the R_MSS of the communication device 10 and the S_MSS of the communication device 10, and a TCP frame equal to or less than the second MTU is sent to the PC 100. The specific MTU used by the PC 100 is invariably equal to or greater than the second MTU. Consequently, the PC 100 can reliably receive the TCP frame sent from the communication device 10. Moreover, in S40, not just the MSS of the PC 100 and the R_MSS of the communication device 10 are taken into consideration, but also the S_MSS of the communication device 10. Consequently, the creation of a TCP sending frame having a data size greater than the FIFO sending buffer FSB of the communication device 10 can be prevented.

As described above, in the TCP, in case the R_MSS determined internally by the communication device 10 is greater than the MSS of the PC 100, it is determined whether to discard the receiving frame using not the R_MSS of the communication device 10 as a standard, but rather the MSS of the PC 100 (i.e. using the first MTU calculated from the MSS of the PC 100 as the standard). That is, in the TCP, the internal R_MSS of the communication device 10 and the MSS actually used as the standard may differ. Consequently, the R_MSS of the communication device 10 and the MSS actually used as the standard may be distinguished, being called "internal receiving maximum data size" and "standard receiving maximum data size" respectively.

Similarly, in the TCP, the S_MSS of the communication device 10 and the MSS which serves as the standard for the data size of the IP packet included in the sending frame (i.e. the MSS in which the calculation of the second MSS is the standard) may differ. Consequently, the S_MSS of the communication device 10 and the MSS actually used as the standard may be distinguished, being called "internal sending maximum data size" and "standard sending maximum data size" respectively.

(Setting Process (FIG. 4))

The user of the communication device 10 can perform a predetermined operation on the operation unit 12 to display a setting screen concerning the jumbo frame. In this case, as shown in FIG. 4, in S50 the determination unit 30 (see FIG. 1) displays the setting screen in the display unit 14. While looking at the setting screen, the user can operate the operation unit 12 to select whether to use the jumbo frame (jumbo frame setting=ON) or not (jumbo frame setting=OFF).

In case of selecting jumbo frame setting=ON, the user can further operate the operation unit 12 to select one value from within a predetermined numerical range as an F_SIZE setting value. In the predetermined numerical range, ETH_MAX is set as a minimum value, and the larger value from among the S_MAX and R_MAX is set as a maximum value.

For example, in case the communication device 10 is a printer, then R_MAX>S_MAX, and consequently the R_MAX is set as the maximum value of the predetermined numerical range. Consequently, in case the communication device 10 is a printer, the F_SIZE can be said to be determined according to the R_MAX (in other words, is determined according to the storage capacity of the FIFO receiving buffer FRB). Further, for example, in case the communication device 10 is a scanner, then S_MAX>R_MAX, and consequently the S_MAX is set as the maximum value of the predetermined numerical range. Consequently, in case the communication device 10 is a scanner, the F_SIZE can be said to be determined according to the S_MAX (in other words, the F_SIZE is determined according to the storage capacity of the FIFO sending buffer FSB).

The determination unit 30 stores, in the memory 24, the value designated by the user as the F_SIZE setting value. Moreover, in case the user designates a value not included in the predetermined numerical range as the F_SIZE setting value, the determination unit 30 may notify the user of a message indicating that this value is not appropriate as the F_SIZE.

In S52, the determination unit 30 judges whether jumbo frame setting=ON has been selected by the user. In case jumbo frame setting=ON has been selected (YES in S52), the process proceeds to S54, and in case jumbo frame setting=OFF has been selected (NO in S52), the process proceeds to S58.

(Judgment Concerning Jumbo Frame Circumstance (S54))

In S54, the judging unit 38 (see FIG. 1) judges whether the LAN 4 is in a circumstance using the jumbo frame. More specifically, in case, for example, the communication device 10 is communicably connected with the PC 100 via a HUB (not shown) included in the LAN 4, the judging unit 38 obtains a signal from the HUB concerning the communication speed that can be achieved between the communication device 10 and the HUB. Further, in case, for example, the communication device 10 is communicably connected with the PC 100 not via the HUB, the judging unit 38 obtains a signal from the PC 100 concerning the communication speed that can be achieved between the communication device 10 and the PC 100. The signal concerning the communication speed indicates any of 10 BASE, 100 BASE and 1000 BASE.

For example, in case the communication speed is 1000 BASE (i.e. gigabit), the LAN 4 could be in a circumstance using the jumbo frame. Consequently, in case the signal concerning the communication speed indicates 1000 BASE (e.g. 1000 BASE-T), the judging unit 38 judges that the LAN 4 is in a circumstance using the jumbo frame (judges YES in S54), and the process proceeds to S56. On the other hand, in case, for example, the communication speed is 10 BASE or 100 BASE, the LAN 4 is usually not in a circumstance using the jumbo frame. Consequently, in case the signal concerning the communication speed indicates 10 BASE or 100 BASE (e.g. 100 BASE-T), the judging unit 38 judges that the LAN 4 is not in a circumstance using the jumbo frame (judges NO in S54), and the process proceeds to S58.

In S56, the determination unit 30 determines the S_MSS, R_MSS, S_MTU and R_MTU utilizing the F_SIZE designated by the user in 850. The contents of the process S56 will be described in detail later.

(In Case of Jumbo Frame Not Being Used (S58))

In S58, the determination unit 30 determines the S_MSS, R_MSS, S_MTU and R_MTU utilizing the ETH_MAX being stored in the memory 24. Specifically, the determination unit 30 first obtains the ETH_MAX, V1 and V2 from the memory 24. Then, the determination unit 30 determines a value (i.e. 1460 bytes) obtained by subtracting the V2 from the ETH_MAX as the S_MSS and R_MSS. That is, in S58, the determination unit 30 determines the S_MSS and R_MSS that have the same value. Then, the determination unit 30 stores the determined value (i.e. 1460 bytes) in the memory 24 as the setting value of the S_MSS and R_MSS.

Further, the determination unit 30 determines a value (i.e. 1500 bytes) obtained by subtracting the V1 from the ETH_MAX as the S_MTU and R_MTU. That is, in S58, the determination unit 30 determines the S_MTU and R_MTU that have the same value. Then, the determination unit 30 stores the determined value (i.e. 1500 bytes) in the memory 24 as the setting value of the S_MTU and R_MTU.

(In Case of Jumbo Frame Being Used (S56))

The contents of S56 will be described in detail. Moreover, below, the four values S_MSS, R_MSS, S_MTU and R_MTU are together called "the four maximum data sizes". In S56, the first obtaining unit 31 (see FIG. 1) obtains the S_MAX and R_MAX being stored in the memory 24 by reading the data from the memory 24. In S56, further, the second obtaining unit 32 (see FIG. 1) obtains the F_SIZE being stored in the memory 24 by reading the data from the memory 24.

(Maximum Value of the Four Maximum Data Sizes (FIG. 5))

The determination unit 30 adopts the values indicated by the formulas shown in FIG. 5 as the respective maximum values of the four maximum data sizes. For example, the determination unit 30 adopts, as the maximum value of the S_MTU, a value in which the V1 has been subtracted from the S_MAX. That is, the determination unit 30 adopts, as the maximum value of the S_MSS, a value in which the V2 has been subtracted from the S_MAX.

If the value of the S_MTU were greater than the value where the V1 has been subtracted from the S_MAX, a sending frame could be created having a data size that the FIFO sending buffer FSB cannot store. By contrast, as shown in FIG. 5, when the maximum value of the S_MTU and S_MSS is determined properly based on the value of the S_MAX, it is possible to prevent the creation of a sending frame having a data size that the FIFO sending buffer FSB cannot store.

Similarly, as shown in FIG. 5, when the maximum value of the R_MTU and R_MSS is determined properly based on the value of the R_MAX, it is possible to prevent a receiving frame that the FIFO receiving buffer FRB cannot store from being received from the LAN 4.

(Concrete Determination Method (FIG. 6))

The determination unit 30 determines the four maximum data sizes according to the formulas shown in FIG. 6. When the formulas shown in FIG. 6 are applied to the printer, the four maximum data sizes are determined as shown in FIG. 7, and when the formulas shown in FIG. 6 are applied to the seamier, the four maximum data sizes are determined as shown in FIG. 8.

First Specific Example (in Case of Printer) (FIG. 7)

As described above, in case the communication device 10 is a printer, the relationship R_MAX>S_MAX is satisfied and, further, the relationship R_MAX≥F_SIZE is satisfied (see S50 of FIG. 4). As shown in FIG. 7, the determination unit 30 determines the S_MTU and S_MSS based on the relationship of the S_MAX, R_MAX and F_SIZE (i.e., S_MAX≥F_SIZE or R_MAX≥F_SIZE>S_MAX).

On the other hand, the determination unit 30 determines the R_MTU and R_MSS regardless of the relationship of the S_MAX, R_MAX and F_SIZE. Specifically, the determination unit 30 determines the values obtained utilizing the F_SIZE, i.e., F_SIZE-V1 and F_SIZE-V2, as the R_MTU and R_MSS respectively.

In case S_MAX≥F_SIZE, the determination unit 30 determines a value (F_SIZE-V1) obtained utilizing the F_SIZE as the S_MTU and R_MTU. Further, in case S_MAX≥F_SIZE, the determination unit 30 determines a value (F_SIZE-V2) obtained utilizing the F_SIZE as the S_MSS and R_MSS.

Moreover, in case S_MAX≥F_SIZE, when determining the four maximum data sizes, the determination unit 30 may perform this determination by subtracting the predetermined value (V1, V2) from the F_SIZE, or may perform this determination by obtaining values stored in advance in the memory 24 (for example, a value equivalent to the F_SIZE-V1, a value equivalent to the F_SIZE-V2). Below, also, in the case of the description "determines a value obtained utilizing . . . as . . . ", either determination method may be used: the method using calculation, or the method obtaining the value from the memory 24.

In case R_MAX≥F_SIZE>S_MAX, the determination unit 30 determines a value (S_MAX-V1) obtained utilizing the S_MAX and a value (F_SIZE-V1) obtained utilizing the F_SIZE as the S_MTU and R_MTU respectively. In this case, the S_MTU and R_MTU have different values.

In case R_MAX≥F_SIZE>S_MAX, the determination unit 30 determines a value (S_MAX-V2) obtained utilizing the S_MAX and a value (F_SIZE-V2) obtained utilizing the F_SIZE as the S_MSS, R_MSS respectively. In this case, the S_MSS and R_MSS have different values.

Moreover, in case R_MAX≥F_SIZE>S_MAX, if the S_MTU and S_MSS were determined utilizing the F_SIZE, which is greater than the S_MAX, the data size of a frame created by the communication device 10 might exceed the storage capacity of the FIFO sending buffer FSB. In this case, the communication device 10 could not send the frame. In order to prevent such a situation, in the example of FIG. 7, the S_MTU and S_MSS are determined utilizing the S_MAX in the case of R_MAX—F_SIZE>S_MAX.

Second Specific Example (in Case of Scanner) (FIG. 8)

As described above, in case the communication device 10 is a scanner, the relationship S_MAX>R_MAX is satisfied and, further, the relationship S_MAX≥F_SIZE is satisfied (see S50 of FIG. 4). As shown in FIG. 8, the determination unit 30 determines the R_MTU and R_MSS based on the relationship of the S_MAX, R_MAX and F_SIZE (i.e., R_MAX≥F_SIZE or S_MAX≥F_SIZE>R_MAX).

On the other hand, the determination unit 30 determines the S_MTU and S_MSS regardless of the relationship of the S_MAX, R_MAX and F_SIZE Specifically, the determination unit 30 determines the values obtained utilizing the F_SIZE, i.e., F_SIZE-V1 and F_SIZE-V2, as the S_MTU, S_MSS respectively.

In case R_MAX≥F_SIZE, the determination unit 30 determines a value (F_SIZE-V1) obtained utilizing the F_SIZE as the S_MTU, R_MTU. Further, in case S_MAX≥F_SIZE, the determination unit 30 determines a value (F_SIZE-V2) obtained utilizing the F_SIZE as the S_MSS and R_MSS.

In case S_MAX≥F_SIZE>R_MAX, the determination unit 30 determines a value (F_SIZE-V1) obtained utilizing the F_SIZE and a value (R_MAX-V1) obtained utilizing the R_MAX as the S_MTU and R_MTU respectively. In this case, the S_MTU and R_MTU have different values.

In case S_MAX≥F_SIZE>R_MAX, the determination unit 30 determines a value (F_SIZE-V2) obtained utilizing the F_SIZE and a value (R_MAX-V2) obtained utilizing the R_MAX as the S_MSS, R_MSS respectively. In this case, the S_MSS and R_MSS have different values.

Moreover, in case S_MAX≥F_SIZE>R_MAX, if the R_MTU and R_MSS were determined utilizing the F_SIZE, which is greater than the R_MAX, the data size of the frame sent from the PC 100 might exceed the storage capacity of the FIFO receiving buffer FRB. In this case, the communication device 10 could not receive the frame. In the example of FIG. 8, in order to prevent such a situation, the R_MTU and R_MSS are determined utilizing the R_MAX in the case of S_MAX≥F_SIZE>R_MAX.

Advantage of First Embodiment

As described above, as shown in the first specific example of FIG. 7, in case R_MAX≥F_SIZE>S_MAX, the communication device 10 determines the S_MTU and S_MSS in accordance with the storage capacity of the FIFO sending buffer FSB (i.e., based on the S_MAX that is determined in accordance with the storage capacity) and determines the R_MTU and R_MSS in accordance with the storage capacity of the FIFO receiving buffer FRB (i.e., based on the F_SIZE, whose maximum value is the R_MAX, the value of the R_MAX being determined in accordance with the storage capacity).

Further, as shown in the second specific example of FIG. 8, in case S_MAX≥F_SIZE>R_MAX, the communication device 10 determines the S_MTU and S_MSS in accordance with the storage capacity of the FIFO sending buffer FSB (i.e., based on the F_SIZE, whose maximum value is designated by the user as the S_MAX, the value of the S_MAX being determined in accordance with the storage capacity) and determines the R_MTU and R_MSS in accordance with the storage capacity of the FIFO receiving buffer FRB (i.e., based on the R_MAX that is determined in accordance with the storage capacity).

That is, according to the present embodiment, the communication device 10 can determine the four maximum data sizes appropriately according to the respective storage capacity of the two buffers FSB, FRB. Consequently, the communication device 10 can use the two buffers FSB, FRB efficiently. Consequently, the communication device 10 can efficiently perform the sending process for the sending frame by utilizing the S_MTU and S_MSS, and can efficiently perform the receiving process for the receiving frame by utilizing the R_MTU and R_MSS.

(Corresponding Relationships)

Both the S_MTU and S_MSS determined in S56 of FIG. 4 are examples of the "sending maximum data size", and both the R_MTU and R_MSS determined in S56 of FIG. 4 are examples of the "receiving maximum data size". Moreover, in case the S_MTU is an example of the "sending maximum data size", the IP packet included in the sending frame is an example of the "sending target data", In case the S_MSS is an example of the "sending maximum data size", the application data included in the sending frame is an example of the "sending target data". Further, in case the R_MTU is an example of the "receiving maximum data size", the IP packet included in the receiving frame is an example of the "receiving target data". In case the R_MSS is an example of the "receiving maximum data size", the application data included in the receiving frame is an example of the "receiving target data".

Second Embodiment

Points that differ from the first embodiment will be described. In the present embodiment, the contents of the process S56 of FIG. 4 differ from the first embodiment. As shown in FIG. 9, in S56 of FIG. 4, the determination unit 30 determines the S_MTU, S_MSS and R_MSS utilizing the same method as the first embodiment. However, the determination unit 30 determines the R_MTU utilizing a method different from the first embodiment (the method shown in FIG. 9). Specifically, regardless of the size of the F_SIZE, the determination unit 30 determines a value (R_MAX-V1) obtained utilizing the R_MAX as the R_MTU.

First Specific Example (in Case of Printer) (FIG. 10)

FIG. 10 shows the four maximum data sizes determined by the process S56 of the present embodiment in case the communication device 10 is a printer. In FIG. 10, parts different from the first specific example (FIG. 7) of the first embodiment are indicated by hatching. Moreover, in the figures below showing specific examples of the printer (i.e., FIG. 13, FIG. 15, FIG. 18), as well, parts different from the first specific example (FIG. 7) of the first embodiment are indicated by hatching.

In case S_MAX≥F_SIZE, the determination unit 30 determines a value (F_SIZE-V1) obtained utilizing the F_SIZE and a value (R_MAX-V1) obtained utilizing the R_MAX as the S_MTU and R_MTU respectively. In this case, the S_MTU and R_MTU have different values.

Further, in case R_MAX≥F_SIZE>S_MAX, the determination unit 30 determines a value (S_MAX-V1) obtained utilizing the S_MAX and a value (R_MAX-V1) obtained utilizing the R_MAX as the S_MTU and R_MTU respectively. In this case, the S_MTU and R_MTU have different values.

Second Specific Example (in Case of Scanner) (FIG. 11)

FIG. 11 shows the four maximum data sizes determined by the process S56 of the present embodiment in case the communication device 10 is a scanner. In FIG. 11, parts different from the second specific example (FIG. 8) of the first embodiment are indicated by hatching. Moreover, in the figures below showing specific examples of the scanner (e.g., FIG. 14, FIG. 16, FIG. 19), as well, parts different from the second specific example (FIG. 8) of the first embodiment are indicated by hatching.

In case R_MAX≥F_SIZE, and in case S_MAX≥F_SIZE>R_MAX, the determination unit 30 determines a value (F_SIZE-V1) obtained utilizing the F_SIZE and a value (R_MAX-V1) obtained utilizing the R_MAX as the S_MTU and R_MTU respectively. In this case, the S_MTU and R_MTU have different values.

Advantage of Second Embodiment

In the present embodiment, advantages similar to the first embodiment are obtained. Further, in the present embodiment, the communication device 10 determines the R_MAX-V1 as the R_MTU regardless of the value of the F_SIZE. Consequently, it does not readily happen that the receiving frame is discarded because the value of the R_MTU used in the receiving process for the non-TCP receiving frame becomes large (see FIG. 2). That is, in the present embodiment, the communication device 10 can efficiently utilize the FIFO receiving buffer FRB, and consequently the receiving process for the receiving frame can be performed efficiently.

Third Embodiment

Points that differ from the above embodiments will be described. In the present embodiment, the contents of the process S56 of FIG. 4 differ from the above embodiments. In the present embodiment, in S56 of FIG. 4, the third obtaining unit 33 obtains an HP_S_SIZE (High Performance Sending SIZE) and an HP_R_SIZE (High Performance Receiving SIZE) that are stored in the memory 24 by reading the data from the memory 24.

(HP_S_SIZE)

The HP_S_SIZE is a value equivalent to ½ the S_MAX value. Consequently, the FIFO sending buffer FSB can simultaneously store two sending frames having the HP_S_SIZE data size. If a configuration is adopted in which sending frames having the HP_S_SIZE data size are created, while one sending frame is being stored in the FIFO sending buffer FSB (i.e. the one sending frame is in the process of being sent to the LAN 4), the process performing unit 36 can create the next one sending frame and move the next one sending frame from the memory buffer MB to the FIFO sending buffer FSB. Thus, since parallel processes can be performed, the efficiency of the sending process can be increased.

Consequently, the efficiency of the sending process for a sending frame having a data size of the HP_S_SIZE is usually greater than the efficiency of the sending process for a sending frame having a data size of the S_MAX. Moreover, the HP_S_SIZE need not be a value equivalent to ½ the S_MAX value, but may be a value equivalent to ⅓ the S_MAX value, or a value equivalent to ¼ the S_MAX value. That is, generally speaking, the HP_S_SIZE may be a value equivalent to 1/m times the S_MAX value (m being an integer equal to or more than 2).

(HP_R_SIZE)

If one receiving frame having the data size R_MAX is received, the next one receiving frame cannot be received unless the one receiving frame is moved from the FIFO receiving buffer FRB to the memory buffer MB. That is, in a state where a receiving frame having the R_MAX data size is received, frame dropping may occur.

In contrast, if the data size of the receiving frame is a data size equivalent to ½ the R_MAX value, the next one receiving frame can be received and stored in the FIFO receiving buffer FRB even in the state where the one receiving frame is being stored in the FIFO receiving buffer FRB. That is, the occurrence of frame dropping can be suppressed. In order to prevent the occurrence of frame dropping, in the present embodiment, the HP_R_SIZE is used that has a value equivalent to ½ the R_MAX value.

As is clear from the above description, the efficiency of the receiving process for a receiving frame having a data size of the HP_R_SIZE is usually greater than the efficiency of the receiving process for a receiving frame having a data size of the R_MAX. Moreover, generally speaking, the HP_R_SIZE may be a value equivalent to 1/n times the R_MAX value (n being an integer equal to or more than 2).

(Concrete Determination Method (FIG. 12))

In the present embodiment, the contents of the process S56 of FIG. 4 differ from the above embodiments. As shown in FIG. 12, in S56 of FIG. 4, the determination unit 30 determines the S_MTU and R_MTU utilizing the same method as the above embodiments. However, the determination unit 30 determines the S_MSS and R_MSS utilizing a method different from the above embodiments (the method shown in FIG. 12).

First Specific Example (in Case of Printer) (FIG. 13)

FIG. 13 shows the S_MSS and R_MSS determined by the process S56 of the present embodiment in case the communication device 10 is a printer. In the first specific example of the present embodiment, the relationship R_MAX>HP_R_SIZE>S_MAX>HP_S_SIZE is satisfied and, further, the relationship R_MAX≥F_SIZE is satisfied (see S50 of FIG. 4).

In case HP_S_SIZE≥F_SIZE, the determination unit 30 determines a value (F_SIZE-V2) obtained utilizing the F_SIZE as the S_MSS and R_MSS.

Further, in case HP_R_SIZE≥F_SIZE>HP_S_SIZE, the determination unit 30 determines a value (HP_S_SIZE-V2) obtained utilizing the HP_S_SIZE and a value (F_SIZE-V2) obtained utilizing the F_SIZE as the S_MSS and R_MSS respectively. In this case, the S_MSS and R_MSS have different values.

Further, in case R_MAX≥F_SIZE>HP_R_SIZE, the determination unit 30 determines a value (HP_S_SIZE-V2) obtained utilizing the HP_S_SIZE and a value (HP_R_SIZE-V2) obtained utilizing the HP_R_SIZE as the S_MSS and R_MSS respectively. In this case, the S_MSS and R_MSS have different values.

Second Specific Example (in Case of Scanner) (FIG. 14)

FIG. 14 shows the S_MSS and R_MSS determined by the process S56 of the present embodiment in case the communication device 10 is a scanner. In the second specific example of the present embodiment, the relationship S_MAX>HP_S_SIZE>R_MAX>HP_R_SIZE is satisfied and, further, the relationship S_MAX≥F_SIZE is satisfied (see S50 of FIG. 4).

In case HP_R_SIZE≥F_SIZE, the determination unit 30 determines a value (F_SIZE-V2) obtained utilizing the F_SIZE as the S_MSS and R_MSS.

Further, in case HP_S_SIZE≥F_SIZE>HP_R_SIZE, the determination unit 30 determines a value (F_SIZE-V2) obtained utilizing the F_SIZE and a value (HP_R_SIZE-V2) obtained utilizing the HP_R_SIZE as the S_MSS and R_MSS respectively. In this case, the S_MSS and R_MSS have different values.

Further, in case S_MAX≥F_SIZE>HP_S_SIZE, the determination unit 30 determines a value (HP_S_SIZE-V2) obtained utilizing the HP_S_SIZE and a value (HP_R_SIZE-V2) obtained utilizing the HP_R_SIZE as the S_MSS and R_MSS respectively. In this case, the S_MSS and R_MSS have different values.

(In Case HP_S_SIZE=S_MAX)

As described above, in the first specific example of FIG. 13 and the second specific example of FIG. 14, the HP_S_SIZE is a value equivalent to ½ the S_MAX value. However, in a third specific example of FIG. 15 and a fourth specific example of FIG. 16, HP_S_SIZE=S_MAX is adopted.

As described above, parallel processes can be performed in the case of creating a sending frame that has a data size (HP_S_SIZE) equivalent to ½ the S_MAX value, and consequently the efficiency of the sending process can be increased. However, the efficiency of the sending process does not change significantly even if parallel processes are performed. In view of these circumstances, in the third specific example and fourth specific example below, HP_S_SIZE=S_MAX is adopted. That is, generally speaking, the HP_S_SIZE may be a value equivalent to 1/m times the S_MAX (m being an integer equal to or more than 1). In case m=1, the efficiency of the sending process for the sending frame having the data size of the HP_S_SIZE is the same as the efficiency of the sending process for the sending frame having the data size of the S_MAX. Consequently, generally speaking, the efficiency of the sending process for a sending frame having the data size of the HP_S_SIZE is equal to or more than the efficiency of the sending process for a sending frame having the data size of the S_MAX.

However, as described above, in a state where a receiving frame having the R_MAX data size is received, frame dropping may occur. In particular, frame dropping occurs readily in case a communication partner sends a plurality of frames with high frequency. That is, the occurrence of frame dropping is greatly dependent on the sending frequency of the communication partner, and the communication device 10 cannot control the sending frequency. Therefore, so as to have a situation in which a receiving frame having a data size equivalent to ½ the R_MAX will be received, in the third and fourth specific examples below, wherever possible the HP_R_SIZE is used that has a value equivalent to ½ the R_MAX, as in the case of the first specific example and second specific example above. That is, HP_R_SIZE=R_MAX is not adopted.

Third Specific Example (in Case of Printer) (FIG. 15)

In the third specific example of the present embodiment, the relationship R_MAX>HP_R_SIZE>S_MAX=HP_S_SIZE is satisfied and, further, the relationship R_MAX≥F_SIZE is satisfied (see S50 of FIG. 4).

In case S_MAX (=HP_S_SIZE)≥F_SIZE, the determination unit 30 determines a value (F_SIZE-V2) obtained utilizing the F_SIZE as the S_MSS and R_MSS.

Further, in case HP_R_SIZE≥F_SIZE>S_MAX (=HP_S_SIZE), the determination unit 30 determines a value (S_MAX-V2) obtained utilizing the S_MAX (=HP_S_SIZE) and a value (F_SIZE-V2) obtained utilizing the F_SIZE as the S_MSS and R_MSS respectively. In this case, the S_MSS and R_MSS have different values.

Further, in case R_MAX≥F_SIZE>HP_R_SIZE, the determination unit 30 determines a value (S_MAX-V2) obtained utilizing the S_MAX (=HP_S_SIZE) and a value (HP_R_SIZE-V2) obtained utilizing the HP_R_SIZE as the S_MSS and R_MSS respectively. In this case, the S_MSS and R_MSS have different values.

Fourth Specific Example (in Case of Scanner) (FIG. 16)

In the fourth specific example of the present embodiment, the relationship S_MAX=HP_S_SIZE>R_MAX>>HP_R_SIZE is satisfied and, further, the relationship S_MAX≥F_SIZE is satisfied (see S50 of FIG. 4).

In case HP_R_SIZE≥F_SIZE, the determination unit 30 determines a value (F_SIZE-V2) obtained utilizing the F_SIZE as the S_MSS and R_MSS.

Further, in case S_MAX (=HP_S_SIZE)≥F_SIZE>HP_R_SIZE, the determination unit 30 determines a value (F_SIZE-V2) obtained utilizing the F_SIZE and determines a value (HP_R_SIZE-V2) obtained utilizing the HP_R_SIZE as the S_MSS and R_MSS respectively. In this case, the S_MSS and R_MSS have different values.

Advantage of Third Embodiment

In the present embodiment, advantages similar to the first embodiment are obtained. Further, in the present embodiment, wherever possible (i.e. in case F_SIZE>HP_S_SIZE), the communication device 10 determines a value (HP_S_SIZE-V2) obtained utilizing the HP_S_SIZE as the S_MSS. In this case, in S40 of FIG. 3, the communication device 10 can calculate the second MTU based on the value (i.e. the S_MSS) obtained utilizing the HP_S_SIZE. That is, in S40 of FIG. 3, the communication device 10 can create a sending frame having the HP_S_SIZE data size. Consequently, the communication device 10 can efficiently perform the sending process for the TCP sending frame.

Further, wherever possible (i.e. in case F_SIZE>HP_R_SIZE), the communication device 10 determines a value (HP_R_SIZE-V2) obtained utilizing the HP_R_SIZE as the R_MSS. In this case, for example, when the communication device 10 sends the SYN/ACK signal in FIG. 3, the communication device 10 notifies the PC 100 of the value (i.e. the R_MSS) obtained utilizing the HP_S_SIZE. Consequently, the PC 100 can create a receiving frame having the HP_S_SIZE data size. Consequently, the communication device 10 can receive the receiving frame having the HP_S_SIZE data size. Consequently, the communication device 10 can efficiently perform the receiving process for the TCP receiving frame.

Moreover, in the present embodiment, the HP_S_SIZE and HP_R_SIZE are respectively examples of the "sending high performance frame size" and the "receiving high performance frame size".

Fourth Embodiment

Points that differ from the third embodiment will be described. In the present embodiment, the contents of the process S56 of FIG. 4 differ from the third embodiment. As shown in FIG. 17, in S56 of FIG. 4, the determination unit 30 determines the R_MTU, S_MSS and R_MSS using the same method as the third embodiment. However, the determination unit 30 determines the S_MTU using a method different from the third embodiment (the method shown in FIG. 17).

First Specific Example (in Case of Printer) (FIG. 18)

In a first specific example of the present embodiment, the relationship R_MAX>HP_R_SIZE>S_MAX>HP_S_SIZE is satisfied and, further, the relationship R_MAX≥F_SIZE is satisfied (see S50 of FIG. 4).

In case HP_S_SIZE≥F_SIZE, the determination unit 30 determines a value (F_SIZE-V1) obtained utilizing the F_SIZE as the S_MTU and R_MTU.

Further, in case R_MAX≥F_SIZE>HP_S_SIZE, the determination unit 30 determines a value (HP_S_SIZE-V1) obtained utilizing the HP_S_SIZE and a value (F_SIZE-V1) obtained utilizing the F_SIZE as the S_MTU and R_MTU respectively. In this case, the S_MTU and R_MTU have different values.

As described above, in the first specific example, the determination unit 30 determines a value (F_SIZE-V1) obtained utilizing the F_SIZE as the R_MTU regardless of the size of the F_SIZE. Instead, in a variant, the determination unit 30 may determine a value (R_MAX-V1) obtained utilizing the R_MAX as the R_MTU regardless of the size of the F_SIZE (see the first specific example (FIG. 10) of the second embodiment).

Second Specific Example (in Case of Scanner) (FIG. 19)

In a second specific example of the present embodiment, the relationship S_MAX>HP_S_SIZE>R_MAX>HP_R_SIZE is satisfied and, further, the relationship S_MAX≥F_SIZE is satisfied (see S50 of FIG. 4).

In case R_MAX≥F_SIZE, the determination unit 30 determines a value (F_SIZE-V1) obtained utilizing the F_SIZE as the S_MTU and R_MTU.

Further, in case HP_S_SIZE≥F_SIZE>R_MAX, the determination unit 30 determines a value (F_SIZE-V1) obtained utilizing the F_SIZE and a value (R_MAX-V1) obtained utilizing the R_MAX as the S_MTU and R_MTU respectively. In this case, the S_MTU and R_MTU have different values.

Further, in case S_MAX≥F_SIZE>HP_S_SIZE, the determination unit 30 determines a value (HP_S_SIZE-V1) obtained utilizing the HP_S_SIZE and a value (R_MAX-V1) obtained utilizing the R_MAX as the S_MTU and R_MTU respectively. In this case, the S_MTU and R_MTU have different values.

As described above, in the second specific example, in case R_MAX≥F_SIZE, the determination unit 30 determines a value (F_SIZE-V1) obtained utilizing the F_SIZE as the R_MTU. Instead, in the variant, the determination unit 30 may determine a value (R_MAX-V1) obtained utilizing the R_MAX as the R_MTU regardless of the size of the F_SIZE (see the second specific example (FIG. 11) of the second embodiment).

Advantage of Fourth Embodiment

In the present embodiment, advantages similar to the first embodiment are obtained. Further, in the present embodiment, wherever possible (i.e. in case F_SIZE>HP_S_SIZE), the communication device 10 determines a value (HP_S_

SIZE-V1) obtained utilizing the HP_S_SIZE as the S_MTU. In this case, in S20 of FIG. 2, the communication device 10 can create a sending frame having the HP_S_SIZE data size. Consequently, the communication device 10 can efficiently perform the sending process for the UDP sending frame.

(First Variant)

In the above embodiments, the communication device 10 is a printer or a scanner. However, the communication device 10 may be a FAX device, telephone, PC, server, mobile phone, PDA, etc. In this case, the vendor of the communication device 10 may design the communication device 10 such that the storage capacity of a buffer corresponding to the one function to be emphasized, from among the data sending function and the data receiving function, is larger than the storage capacity of a buffer corresponding to the other function.

(Second Variant)

In the above embodiments, the functions of the units 30 to 38 are realized by the CPU 22 performing processes according to programs. However, at least one function of the units 30 to 38 may be realized by hardware such as a logic circuit.

The invention claimed is:

1. A printer configured to be connected with a network, the printer comprising:
   a media access control ("MAC") chip dedicated to performing processes in a MAC layer of an Open Systems Interconnection ("OSI") model, the MAC chip comprising:
      a sending buffer configured to store at least one sending frame to be sent to the network, the sending buffer having a first storage capacity; and
      a receiving buffer configured to store at least one receiving frame to be received from the network, the receiving buffer having a second storage capacity which is greater than the first storage capacity,
      wherein the sending buffer is configured to store the at least one sending frame but not to store the receiving frame, and the receiving buffer is configured to store the at least one receiving frame but not to store the sending frame;
   a PHY chip dedicated to performing processes in a physical layer of the OSI model, wherein the PHY chip is configured to receive the at least one receiving frame to be stored in the receiving buffer from the network, and wherein the PHY chip is configured to send the at least one sending frame from the sending buffer to the network;
   one or more processors; and
   a memory comprising a memory buffer,
   wherein the memory buffer is configured to store the sending frame before the sending frame is moved from the memory to the sending buffer,
   wherein the memory buffer is further configured to store the receiving frame after the receiving frame is moved from the receiving buffer to the memory,
   wherein the memory further stores a computer program including instructions to be executed by the one or more processors, and
   wherein the instructions cause the one or more processors, when executed by the one or more processors in a case where the network is in a circumstance using a jumbo frame, to:
      obtain a sending maximum frame size and a receiving maximum frame size which is greater than the sending maximum frame size, wherein the sending maximum frame size is a maximum data size of one sending frame that the sending buffer is capable of storing, the sending maximum frame size is determined in accordance with the first storage capacity, the receiving maximum frame size is a maximum data size of one receiving frame that the receiving buffer is capable of storing, and the receiving maximum frame size is determined in accordance with the second storage capacity;
      obtain a designated data size which is a data size designated by a user, the designated data size being a data size between a maximum data size of one frame in a circumstance not using the jumbo frame and the receiving maximum frame size which is a greater one among the sending maximum frame size and the receiving maximum frame size;
      determine a sending maximum data size and a receiving maximum data size which is greater than the sending maximum data sized based on a relationship of the sending maximum frame size, the receiving maximum frame size, and the designated data size, wherein the sending maximum data size is a maximum data size allowed as a data size of sending target data included in one sending frame, the receiving maximum data size is a maximum data size allowed as a data size of receiving target data included in one receiving frame; and
      perform a sending process for a sending frame of a sending target by utilizing the determined sending maximum data size, and perform a receiving process for a receiving frame of a receiving target by utilizing the determined receiving maximum data size.

2. The printer as in claim 1, wherein
the sending maximum data size is a sending Maximum Segment Size ("MSS") which is a maximum data size allowed as a data size of application data included in the one sending frame, and
the receiving maximum data size is a receiving Maximum Segment Size ("MSS") which is a maximum data size allowed as a data size of application data included in the one receiving frame.

3. The printer as in claim 1, wherein
the sending maximum data size is a sending Maximum Transmission Unit ("MTU") which is a maximum data size allowed as a data size of an IP packet included in the one sending frame, and
the receiving maximum data size is a receiving Maximum Transmission Unit ("MTU") which is a maximum data size allowed as a data size of an IP packet included in the one receiving frame.

4. The printer as in claim 1, wherein
the following relationship is being satisfied:
   the receiving maximum frame size >the sending maximum frame size; and
   the receiving maximum frame size ≥the designated data size,
in a case of the designated data size >the sending maximum frame size,
   a value obtained utilizing the sending maximum frame size is determined as a sending Maximum Segment Size ("MSS") which is the sending maximum data size, and
   a value obtained utilizing the designated data size is determined as a receiving Maximum Segment Size ("MSS") which is the receiving maximum data size.

5. The printer as in claim 1, wherein
the following relationship is being satisfied:
  the receiving maximum frame size >the sending maximum frame size; and
  the receiving maximum frame size ≥the designated data size,
in a case of the designated data size >the sending maximum frame size,
  a value obtained utilizing the sending maximum frame size is determined as a sending Maximum Transmission Unit ("MTU") which is the sending maximum data size, and
  a value obtained utilizing the designated data size is determined as a receiving Maximum Transmission Unit ("MTU") which is the receiving maximum data size.

6. The printer as in claim 1, wherein
the following relationship is being satisfied:
  the receiving maximum frame size >the sending maximum frame size; and
  the receiving maximum frame size ≥the designated data size,
in a case of the sending maximum frame size ≥the designated data size,
  a value obtained utilizing the designated data size is determined as a sending Maximum Transmission Unit ("MTU") which is the sending maximum data size, and
  a value obtained utilizing the receiving maximum frame size is determined as a receiving Maximum Transmission Unit ("MTU") which is the receiving maximum data size.

7. The printer as in claim 1, wherein
the following relationship is being satisfied:
  the receiving maximum frame size >the sending maximum frame size; and
  the receiving maximum frame size ≥the designated data size,
in a case of the designated data size ≥the sending maximum frame size,
  a value obtained utilizing the sending maximum frame size is determined as a sending Maximum Transmission Unit ("MTU") which is the sending maximum data size, and
  a value obtained utilizing the receiving maximum frame size is determined as a receiving Maximum Transmission Unit ("MTU") which is the receiving maximum data size.

8. The printer as in claim 1, wherein
to determine the sending maximum data size and the receiving maximum data size, the instructions further cause the one or more processors to:
obtain a sending high performance frame size which is determined in accordance with the sending maximum frame size, and a receiving high performance frame size which is determined in accordance with the receiving maximum frame size,
an efficiency of the sending process for a sending frame having a data size which is identical to the sending high performance frame size is equal to or higher than an efficiency of the sending process for a sending frame having a data size which is identical to the sending maximum frame size,
an efficiency of the receiving process for a receiving frame having a data size which is identical to the receiving high performance frame size is higher than an efficiency of the receiving process for a receiving frame having a data size which is identical to the receiving maximum frame size,
the following relationship is being satisfied:
  the receiving maximum frame size >the receiving high performance frame size >the sending maximum frame size ≥the sending high performance frame size; and
  the receiving maximum frame size ≥the designated data size,
in a case of the receiving high performance frame size ≥the designated data size >the sending high performance frame size,
  a value obtained utilizing the sending high performance frame size is determined as a sending Maximum Segment Size ("MSS") which is the sending maximum data size, and
  a value obtained utilizing the designated data size is determined as a receiving Maximum Segment Size ("MSS") which is the receiving maximum data size.

9. The printer as in claim 1, wherein
to determine the sending maximum data size and the receiving maximum data size, the instructions further cause the one or more processors to:
obtain a sending high performance frame size which is determined in accordance with the sending maximum frame size, and a receiving high performance frame size which is determined in accordance with the receiving maximum frame size,
an efficiency of the sending process for a sending frame having a data size which is identical to the sending high performance frame size is equal to or higher than an efficiency of the sending process for a sending frame having a data size which is identical to the sending maximum frame size,
an efficiency of the receiving process for a receiving frame having a data size which is identical to the receiving high performance frame size is higher than an efficiency of the receiving process for a receiving frame having a data size which is identical to the receiving maximum frame size,
the following relationship is being satisfied:
  the receiving maximum frame size >the receiving high performance frame size >the sending maximum frame size ≥the sending high performance frame size; and
  the receiving maximum frame size ≥the designated data size,
in a case of the designated data size >the receiving high performance frame size,
  a value obtained utilizing the sending high performance frame size is determined as a sending Maximum Segment Size ("MSS") which is the sending maximum data size, and
  a value obtained utilizing the receiving high performance frame size is determined as a receiving Maximum Segment Size ("MSS") which is the receiving maximum data size.

10. The printer as in claim 1, wherein the instructions further cause the one or more processors, when executed by the one or more processors, to:
  judge whether the network is in the circumstance using the jumbo frame,
  wherein in a case where it is judged that the network is in the circumstance using the jumbo frame, the sending maximum data size and the receiving maximum data size are determined based on the relationship of the sending maximum frame size, the receiving maximum frame size, and the designated data size.

11. The printer as in claim 10, wherein
it is judged that the network is in the circumstance using the jumbo frame in a case where a signal received from the network indicates that the network corresponds to the gigabit Ethernet, and
it is judged that the network is not in the circumstance using the jumbo frame in a case where the signal received from the network indicates that the network does not correspond to the gigabit Ethernet.

12. A printer configured to be connected with a network, the printer comprising:
a media access control ("MAC") chip dedicated to performing processes in a MAC layer of an Open Systems Interconnection ("OSI") model, the MAC chip comprising:
a sending buffer configured to store at least one sending frame to be sent to the network, the sending buffer having a first storage capacity; and
a receiving buffer configured to store at least one receiving frame to be received from the network, the receiving buffer having a second storage capacity which is greater than the first storage capacity,
wherein the sending buffer is configured to store the at least one sending frame but not to store the receiving frame, and the receiving buffer is configured to store the at least one receiving frame but not to store the sending frame;
a PHY chip dedicated to performing processes in a physical layer of the OSI model, wherein the PHY chip is configured to receive the at least one receiving frame to be stored in the receiving buffer from the network, and wherein the PHY chip is configured to send the at least one sending frame from the sending buffer to the network;
a memory comprising a memory buffer,
wherein the memory buffer is configured to store the sending frame before the sending frame is moved from the memory to the sending buffer,
wherein the memory buffer is further configured to store the receiving frame after the receiving frame is moved from the receiving buffer to the memory,
a determination unit configured to determine a sending maximum data size in accordance with the first storage capacity, and determine a receiving maximum data size in accordance with the second storage capacity, wherein the sending maximum data size is a maximum data size allowed as a data size of sending target data included in one sending frame, the receiving maximum data size is a maximum data size allowed as a data size of receiving target data included in one receiving frame, and the sending maximum data size and the receiving maximum data size have different values; and
a process performing unit configured to perform a sending process for a sending frame of a sending target by utilizing the sending maximum data size, and perform a receiving process for a receiving frame of a receiving target by utilizing the receiving maximum data size,
wherein, to determine the sending maximum data size and the receiving maximum date size, the instructions further cause the one or more processors in a case where the network is in a circumstance using a jumbo frame, to:
obtain a sending maximum frame size and a receiving maximum frame size which is greater than the sending maximum frame size, wherein the sending maximum frame size is a maximum data size of one sending frame that the sending buffer is capable of storing, the sending maximum frame size is determined in accordance with the first storage capacity, the receiving maximum frame size is a maximum data size of one receiving frame that the receiving buffer is capable of storing, and the receiving maximum frame size is determined in accordance with the second storage capacity; and
obtain a designated data size which is a data size designated by a user, the designated data size being a data size between a maximum data size of one frame in a circumstance not using the jumbo frame and the receiving maximum frame which is a greater one among the sending maximum frame size and the receiving maximum frame size;
determine a sending maximum data size and a receiving maximum data size which is greater than the sending maximum data size based on a relationship of the sending maximum frame size, the receiving maximum frame size, and the designated data size, wherein the sending maximum data size is a maximum data size allowed as a data size of sending target data included in one sending frame, the receiving maximum data size is a maximum data size allowed as a data size of receiving target data included in one receiving frame.

13. A scanner configured to be connected with a network, the scanner comprising:
a media access control ("MAC") chip dedicated to performing processes in a MAC layer of an Open Systems Interconnection ("OSI") model, the MAC chip comprising:
a sending buffer configured to store at least one sending frame to be sent to the network, the sending buffer having a first storage capacity; and
a receiving buffer configured to store at least one receiving frame to be received from the network, the receiving buffer having a second storage capacity which is less than the first storage capacity,
wherein the sending buffer is configured to store the at least one sending frame but not to store the receiving frame, and the receiving buffer is configured to store the at least one receiving frame but not to store the sending frame;
a PHY chip dedicated to performing processes in a physical layer of the OSI model, wherein the PHY chip is configured to receive the at least one receiving frame to be stored in the receiving buffer from the network, and wherein the PHY chip is configured to send the at least one sending frame from the sending buffer to the network;
one or more processors; and
a memory comprising a memory buffer,
wherein the memory buffer is configured to store the sending frame before the sending frame is moved from the memory to the sending buffer,
wherein the memory buffer is further configured to store the receiving frame after the receiving frame is moved from the receiving buffer to the memory,
wherein the memory further stores a computer program including instructions to be executed by the one or more processors, and
wherein the instructions cause the one or more processors, when executed by the one or more processors in a case where the network is in a circumstance using a jumbo frame, to:

obtain a sending maximum frame size and a receiving maximum frame size which is less than the sending maximum frame size, wherein the sending maximum frame size is a maximum data size of one sending frame that the sending buffer is capable of storing, the sending maximum frame size is determined in accordance with the first storage capacity, the receiving maximum frame size is a maximum data size of one receiving frame that the receiving buffer is capable of storing, and the receiving maximum frame size is determined in accordance with the second storage capacity;

obtain a designated data size which is a data size designated by a user, the designated data size being a data size between a maximum data size of one frame in a circumstance not using the jumbo frame and the sending maximum frame size which is greater one among the sending maximum frame size and the receiving maximum frame size;

determine a sending maximum data size and a receiving maximum data size which is less than the sending maximum data based on a relationship of the sending maximum frame size, the receiving maximum frame size, and the designated data size, wherein the sending maximum data size is a maximum data size allowed as a data size of sending target data included in one sending frame, the receiving maximum data size is a maximum data size allowed as a data size of receiving target data included in one receiving frame; and perform a sending process for a sending frame of a sending target by utilizing the determined sending maximum data size, and perform a receiving process for a receiving frame of a receiving target by utilizing the determined receiving maximum data size.

14. The scanner as in claim 13, wherein:
the sending maximum data size is a sending Maximum Segment Size ("MSS") which is a maximum data size allowed as a data size of application data included in the one sending frame, and
the receiving maximum data size is a receiving Maximum Segment Size ("MSS") which is a maximum data size allowed as a data size of application data included in the one receiving frame.

15. The scanner as in claim 13, wherein:
the sending maximum data size is a sending Maximum Transmission Unit ("MTU") which is a maximum data size allowed as a data size of an IP packet included in the one sending frame, and
the receiving maximum data size is a receiving Maximum Transmission Unit ("MTU") which is a maximum data size allowed as a data size of an IP packet included in the one receiving frame.

16. The scanner as in claim 13, wherein the following relationship is being satisfied:
the sending maximum frame size >the receiving maximum frame size; and
the sending maximum frame size ≥the designated data size, and
in a case of the designated data size >the receiving maximum frame size,
a value obtained utilizing the designated data size is determined as a sending Maximum Segment Size ("MSS") which is the sending maximum data size, and a value obtained utilizing the receiving maximum frame size is determined as a receiving Maximum Segment Size ("MSS") which is the receiving maximum data size.

17. The scanner as in claim 13, wherein the following relationship is being satisfied:
the sending maximum frame size >the receiving maximum frame size; and
the sending maximum frame size ≥the designated data size, and
in a case of the designated data size >the receiving maximum frame size,
a value obtained utilizing the designated data size is determined as a sending Maximum Transmission Unit ("MTU") which is the sending maximum data size, and
a value obtained utilizing the receiving maximum frame size is determined as a receiving Maximum Transmission Unit ("MTU") which is the receiving maximum data size.

18. The scanner as in claim 13, wherein
the following relationship is being satisfied:
the sending maximum frame size >the receiving maximum frame size; and
the sending maximum frame size ≥the designated data size, and
in a case of the receiving maximum frame size ≥the designated data size,
a value obtained utilizing the designated data size is determined as a sending Maximum Transmission Unit ("MTU") which is the sending maximum data size, and
a value obtained utilizing the receiving maximum frame size is determined as a receiving Maximum Transmission Unit ("MTU") which is the receiving maximum data size.

19. The scanner as in claim 13, wherein:
to determine the sending maximum data size and the receiving maximum data size, the instructions further cause the one or more processors to:
obtain a sending high performance frame size which is determined in accordance with the sending maximum frame size, and a receiving high performance frame size which is determined in accordance with the receiving maximum frame size,
an efficiency of the sending process for a sending frame having a data size which is identical to the sending high performance frame size is equal to or higher than an efficiency of the sending process for a sending frame having a data size which is identical to the sending maximum frame size,
an efficiency of the receiving process for a receiving frame having a data size which is identical to the receiving high performance frame size is higher than an efficiency of the receiving process for a receiving frame having a data size which is identical to the receiving maximum frame size,
the following relationship is being satisfied:
the sending maximum frame size ≥the sending high performance frame size >the receiving maximum frame size >the receiving high performance frame size; and
the sending maximum frame size ≥the designated data size, and
in a case of the sending high performance frame size ≥the designated data size >the receiving high performance frame size, a value obtained utilizing the designated data size is determined as a sending Maximum Segment Size ("MSS") which is the sending maximum data size, and a value obtained utilizing the receiving high performance frame size is determined as a receiving Maximum Segment Size ("MSS") which is the receiving maximum data size.

20. The scanner as in claim 13, wherein:

to determine the sending maximum data size and the receiving maximum data size, the instructions further cause the one or more processors to:

obtain a sending high performance frame size which is determined in accordance with the sending maximum frame size, and a receiving high performance frame size which is determined in accordance with the receiving maximum frame size, an efficiency of the sending process for a sending frame having a data size which is identical to the sending high performance frame size is equal to or higher than an efficiency of the sending process for a sending frame having a data size which is identical to the sending maximum frame size, an efficiency of the receiving process for a receiving frame having a data size which is identical to the receiving high performance frame size is higher than an efficiency of the receiving process for a receiving frame having a data size which is identical to the receiving maximum frame size, the following relationship is being satisfied:

the sending maximum frame size ≥the sending high performance frame size >the receiving maximum frame size >the receiving high performance frame size; and the sending maximum frame size ≥the designated data size, and in a case of the designated data size >the sending high performance frame size, a value obtained utilizing the sending high performance frame size is determined as a sending Maximum Segment Size ("MSS") which is the sending maximum data size, and a value obtained utilizing the receiving high performance frame size is determined as a receiving Maximum Segment Size ("MSS") which is the receiving maximum data size.

21. The scanner as in claim 13, wherein the instructions further cause the one or more processors, when executed by the one or more processors, to:

judge whether the network is in the circumstance using the jumbo frame, wherein in a case where it is judged that the network is in the circumstance using the jumbo frame, the sending maximum data size and the receiving maximum data size are determined based on the relationship of the sending maximum frame size, the receiving maximum frame size, and the designated data size.

22. The scanner as in claim 21, wherein it is judged that the network is in the circumstance using the jumbo frame in a case where a signal received from the network indicates that the network corresponds to the gigabit Ethernet, and it is judged that the network is not in the circumstance using the jumbo frame in a case where the signal received from the network indicates that the network does not correspond to the gigabit Ethernet.

* * * * *

UNITED STATES PATENT AND TRADEMARK OFFICE
CERTIFICATE OF CORRECTION

PATENT NO.         : 9,762,511 B2
APPLICATION NO.    : 13/356549
DATED              : September 12, 2017
INVENTOR(S)        : Ken Saito It is certified that error appears in the above-identified patent and that said Letters Patent is hereby corrected as shown below:

In the Claims

Claim 12, Column 25, Line 61, change "maximum date size," to --maximum data size,--.

Claim 12, Column 26, Line 14, change "frame which is a greater" to --frame size which is greater--.

Signed and Sealed this
Seventeenth Day of April, 2018

Andrei Iancu
*Director of the United States Patent and Trademark Office*